US012100248B2

(12) United States Patent
Rupani et al.

(10) Patent No.: US 12,100,248 B2
(45) Date of Patent: Sep. 24, 2024

(54) METHOD AND SYSTEM FOR PROVIDING SECURE ACCESS TO DEVICE OPERATIONS AND STORED DATA TO CONSUMER APPLICATIONS

(71) Applicant: Aeris Communications, Inc., San Jose, CA (US)

(72) Inventors: Kunal Rupani, San Jose, CA (US); Narendra Sharma, Sunnyvale, CA (US); Eran Netanel, Belmont, CA (US); Yixiang Chen, Palo Alto, CA (US); Drew S. Johnson, San Jose, CA (US); Andrew Durrer, San Jose, CA (US); Michael Garner, Richardson, TX (US)

(73) Assignee: Aeris Communications, Inc., San Jose, CA (US)

( * ) Notice: Subject to any disclaimer, the term of this patent is extended or adjusted under 35 U.S.C. 154(b) by 883 days.

(21) Appl. No.: 17/175,629

(22) Filed: Feb. 13, 2021

(65) Prior Publication Data

US 2021/0166501 A1 Jun. 3, 2021

Related U.S. Application Data

(63) Continuation-in-part of application No. 16/052,684, filed on Aug. 2, 2018, now Pat. No. 10,922,904, which is a continuation of application No. 15/056,990, filed on Feb. 29, 2016, now Pat. No. 10,055,901, which is a continuation of application No. 13/482,825, filed on May 29, 2012, now Pat. No. 9,275,503.

(Continued)

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC ... G07C 5/008; G07C 5/0808; G07C 2205/02
See application file for complete search history.

(56) References Cited

U.S. PATENT DOCUMENTS 7,881,251 B2 * 2/2011 Hovey .................. H04L 69/326 370/328
8,140,358 B1 3/2012 Ling
(Continued)

OTHER PUBLICATIONS

"What is a packet?", HowStuffWorks, Archived Mar. 24, 2009.

*Primary Examiner* — Michael V Kerrigan
(74) *Attorney, Agent, or Firm* — Shih IP Law Group, PLLC

(57) ABSTRACT

In one or more embodiments, method, system and computer program product for providing secure access to device data and/or device operations by an application are disclosed. The method for providing secure access to one or more devices by an application includes receiving application information for the application; receiving device information for the one or more devices to which the application is requesting access; receiving rules for allowing the application to access the one or more devices, wherein the access to the one or more devices includes device data, one or more device operations or a combination thereof; and allowing the application to access the device based on the rules.

39 Claims, 14 Drawing Sheets

200

Related U.S. Application Data

(60) Provisional application No. 61/625,850, filed on Apr. 18, 2012.

(56) References Cited

U.S. PATENT DOCUMENTS

| | | | | |
|---|---|---|---|---|
| 8,375,412 | B2 | 2/2013 | Bugenhagen | |
| 2010/0256861 | A1 | 10/2010 | Hodges | |
| 2011/0234427 | A1 | 9/2011 | Ingram | |
| 2014/0040434 | A1 * | 2/2014 | Rybak | G07C 5/085 709/219 |

* cited by examiner

200

300

410
Receive vehicle data
420
Transmit at least one message
430
From Device Side provide Over Network
Device ID, Network ID, Received Vehicle Data
440
Receive Service Side Message from Device Side
450
Decode, Process information of Message
460
Store vehicle data per client profile at data store
400

Device Data Access using API One

500

Device Operation Access using API One Figure 5B
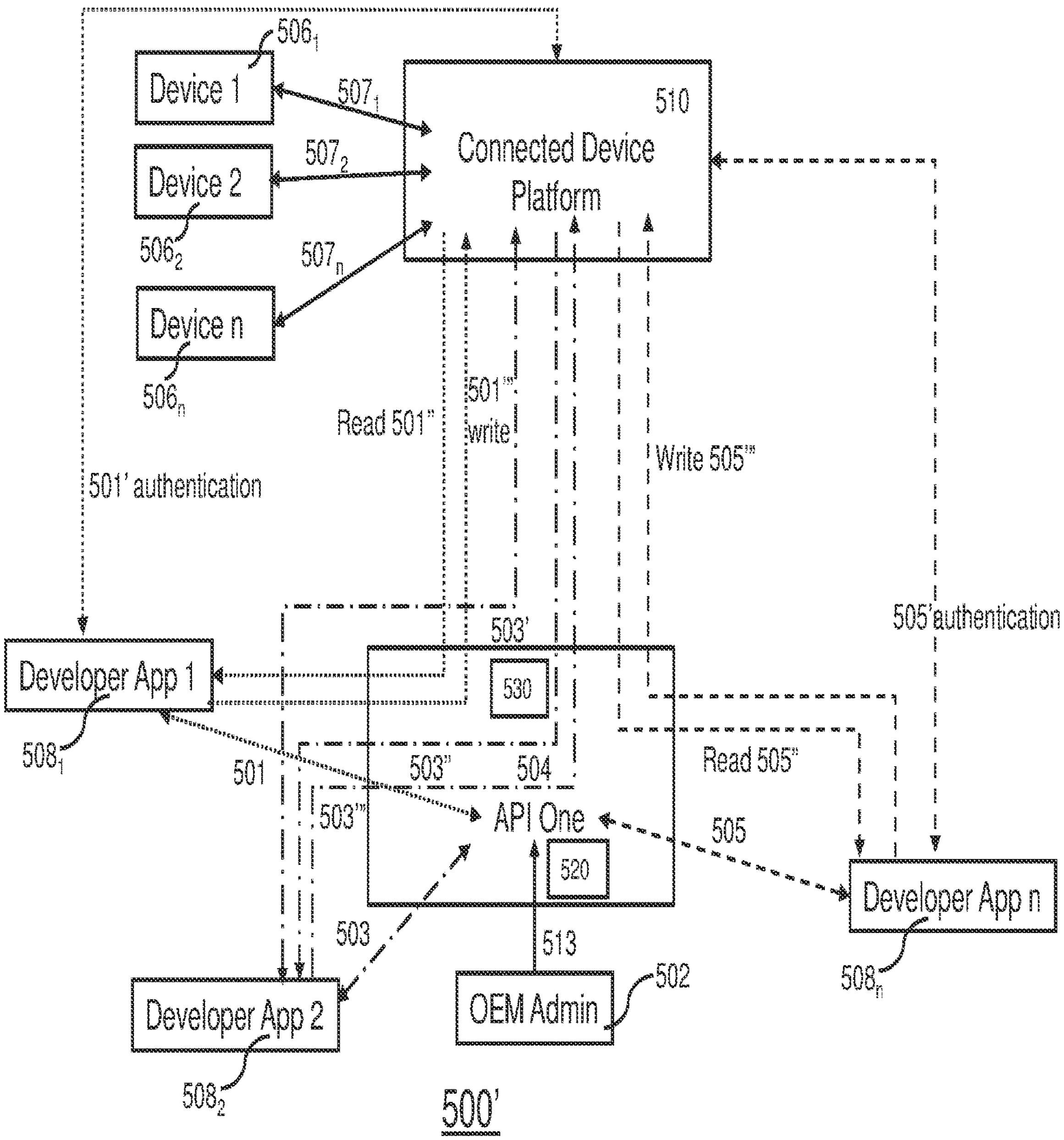
500'

600

600'

700

700'

700"

800

METHOD AND SYSTEM FOR PROVIDING SECURE ACCESS TO DEVICE OPERATIONS AND STORED DATA TO CONSUMER APPLICATIONS

CROSS-REFERENCE TO RELATED APPLICATIONS

This application is a Continuation-In-Part application and claims priority to U.S. application Ser. No. 16/052,684, filed Aug. 2, 2018, which is a Continuation of U.S. application Ser. No. 15/056,990, filed Feb. 29, 2016; which is a Continuation application and claims priority to U.S. application Ser. No. 13/482,825, filed May 29, 2012, entitled "METHOD AND APPARATUS FOR REMOTELY COMMUNICATING VEHICLE INFORMATION TO THE CLOUD," which claims the benefit of U.S. Provisional Patent Application No. 61/625,850, filed on Apr. 18, 2012, entitled "SYSTEM AND METHOD FOR COLLECTING AND SHARING VEHICLE DATA THROUGH A SERVICE MIDDLEWARE," all of which are incorporated herein by reference in their entireties.

FIELD OF THE INVENTION

The present invention relates generally to the communication of device data, diagnostics and related information with a network remote from the device, and more particularly to communications, storage of device data in the cloud as well as providing access to device operations and/or device data to consumer applications while maintaining data privacy and security, consent management and monetization.

BACKGROUND OF THE INVENTION

On Board Diagnostic (OBD) systems provide a method for vehicles to self-diagnose and report on the diagnosis through readers that are compatible with the OBD protocol. Early OBD systems often illuminated a light or switch to visual report an incident requiring attention or correction. In 1996, the OBD-II standard (an improvement over the original OBD) was mandated as being a required approach and capability for all automobiles sold within the United States.

The OBD-II standard provides for a specific diagnostic connector with pins of a particular orientation (i.e., a standard hardware interface), specific availability of certain electrical signaling protocols (i.e., communication protocols), and a particular messaging format (i.e., report out). FIG. 1 provides a representative view of a OBD-II diagnostic connector 100 and a tethered reader 150 with a display 175. In FIG. 1, the standard interface to be read from is typically a female 16-slot connector 100 (e.g., (2×8) J1962 connector) that provides a communication link from the vehicle (not shown) to a reader 150 having a corresponding male 16-pin connector 155 when the reader connector is attached to the connector. Once attached (the connector 100 and the reader connector 155) the reader 150 is capable to receive signal inputs from the vehicle through the connection 100 and visually present information about the vehicle on a screen 175 of the reader. Typically one of the slots 110 in the connector 100 provides power to the reader (i.e., scan tool or scan device) originating from the battery of the vehicle, although often separate power to the reader is provided for.

Some of the information about the vehicle that is available for display includes vehicle parameters and data from the engine control unit (ECU) and offers an information inside a vehicle, typically in an encoded format. Vehicle parameters that provide information about emissions, oxygen sensor status and conditions, cylinder operations, etc., are some examples. Many vehicle manufacturers have enabled the OBD-II Data Link Connector to be the primary connector in the vehicle through which many systems are diagnosed and programmed. Information concerning such systems is provided for as OBD-II Diagnostic Trouble Codes (DTCs) and are typically 4-digits with an alphabetic prefix of: P for engine and transmission (powertrain), B for body, C for chassis, and U for network. When properly connected and powered, the reader is able to decode the encoded vehicle data for the specific vehicle being evaluated and a diagnosis of vehicle systems and functions and/or operations can be determined based on received codes.

OBD-II can interface with multiple communication protocols deployed inside a vehicle. There are five protocols used in the OBD-II vehicle diagnostics standard: (1) Society of Automotive Engineers (SAE) J1850 pulse-width modulation (PWM)—a standard of the Ford Motor Company; (2) SAE J1850 variable pulse width (VPW)—a standard of General Motors; (3) International Organization for Standardization (ISO) 9141-2, which is primarily used in Chrysler, European, and Asia vehicles; (4) ISO 14230 Keyword Protocol 2000 (KWP2000); and (5) ISO 15765 Controller Area Network (CAN) bus, where vehicles sold in the US are required to implement CAN as one of their signaling protocols as of 2008.

OBD II has proven to be a standard having widespread utilization in the automobile industry and more recently in adjacent industrial and medical-related markets. However, the application of utilization of OBD II remains limited to localized methods of display and communications. For instance, the tethered communication arrangement of FIG. 1 proves to be inconvenient in accessing and storing the acquired data from the tethered reader. Other applications of OBD II are known to include the application of additional communication methods including universal serial bus (USB) communication linkages to local personal computers (PCs) adapted with the 16-pin connectors or Bluetooth® arrangements for nearby communications with PC devices (Bluetooth is a trademark of Bluetooth SIG, Inc.). Still others may involve the further implementation of customized protocols which provide to be uneconomical or unable to provide adequate flexibility in communications.

However, what is desired is the ability to extract vehicle diagnostics and related information from vehicles and equipment using one or more existing OBD II communications protocols while being able to link and store the acquired diagnostic and information in the cloud, via cloud computing, for further utilization.

Further utilization of this stored data and/or access to device operations may include use of third-party web applications and/or mobile applications (collectively referred to as apps) by end users to carry out different tasks, for example, in case of vehicles, find parking, deliver fuel to their vehicles, perform repairs and maintenance, deliver packages (for example, Amazon, FedEx. UPS) etc. These third-party service providers need permissions (authorization) from the device owner/IOT device/solution owner, for example, connected car owner to perform actions on theft device, for example: open/close trunk of a vehicle to deliver packages by the delivery person. The delivery person, in their app, needs to be able to open/close trunk of the vehicle of the owner whom they are delivering the package.

Therefore, it is further desired that access to the data as well as authorized device operations by third-party apps is carried out securely while maintaining data privacy and security, consent management and monetization. For example, authorization from an IoT device/service owner to the service provider that is secure and valid for a particular period of time to perform these operations.

Hence it is further desired to provide a platform that would allow for maintaining data privacy and security, perform consent management and monetization and provide secure access to the device data and/or authorized device operations to the third-party mobile and web applications also known as consumer applications.

As used herein the terms mobile device, third party system, smart phone, terminal, remote device, wireless asset, etc. are intended to be inclusive, interchangeable, and/or synonymous with one another and other similar communication-based equipment for purposes of the present invention though one will recognize that functionally each may have unique characteristics, operations which may be specific to its individual capabilities and/or deployment.

As used herein the term cloud is intended to include a computing infrastructure that provides for entrusted services with data, software and computation over a network, where such a network is not constrained to be necessarily localized or of a particular configuration. The term cloud includes networks and network arrangements, such as the Internet, which provide for cloud computing capability.

As used herein the term cloud computing is understood to include methods of utilizing various connected computing devices, servers, clusters of servers, wired and/or wirelessly, which provide a networked infrastructure to deliver computing, processing and storage capacity as services where a user typically accesses cloud-based applications through a web browser, mobile application (i.e., app) or similar while the primary software and data are stored on servers of the cloud network at a remote location. Devices capable of providing computer processing capabilities (i.e, servers, PCs, computers, processors, etc.) are intended to be used interchangeably herein.

SUMMARY OF THE INVENTION

The present invention fulfills these needs and has been developed in response to the present state of the art, and in particular, in response to the problems and needs in the art that have not yet been fully solved by currently available technologies.

In one or more embodiments, a computer-implemented method, system and computer program product for providing secure access to one or more devices by an application are disclosed.

In an embodiment, the computer-implemented method for providing secure access to one or more devices by an application includes receiving application information for the application; receiving device information for the one or more devices to which the application is requesting access, wherein the device information for the one or more devices include any one or more of: device identifier (device ID), device capabilities and permissions model for each of the one or more devices. The method further includes receiving rules for allowing the application to access the one or more devices, wherein the access to the one or more devices includes device data, one or more device operations or a combination thereof and allowing the application to access the device based on the rules.

In another embodiment, the system for providing secure access to one or more devices by an application includes one or more devices, an authorization, authentication and data broker platform and an application, wherein the authorization, authentication and data broker platform: receives application information for the application requesting the access; receives device information for the one or more devices to which the application is requesting access, wherein the device information for the one or more devices includes any one or more of: device identifier (device ID), device capabilities and permissions model for each of the one or more devices. The authorization, authentication and data broker platform further receives rules for allowing the application to access the one or more devices, wherein the access to the one or more devices includes access to device data, one or more device operations or a combination thereof and allows the application to access the one or more devices based on the rules.

In yet another embodiment, a computer program product stored on a computer readable medium for providing secure access to one or more devices by an application, having computer readable instructions for causing a computer to control an execution of an application for providing secure access to one or more devices by an application including receiving application information for the application; receiving device information for the one or more devices to which the application is requesting access, wherein the device information for the one or more devices include any one or more of: device identifier (device ID), device capabilities and permissions model for each of the one or more devices. The instructions further include receiving rules for allowing the application to access the one or more devices, wherein the access to the one or more devices includes device data, one or more device operations or a combination thereof and allowing the application to access the device based on the rules.

BRIEF DESCRIPTION OF DRAWINGS

FIG. 5B depicts a system and process 500' for providing secure access to device operations by an application in accordance with one or more embodiments described herein.

DETAILED DESCRIPTION OF PREFERRED EMBODIMENTS

The present invention relates generally to the communication of vehicle data, diagnostics and related information with a network remote from the vehicle, and more particularly to communications and storage of vehicle data in the cloud.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
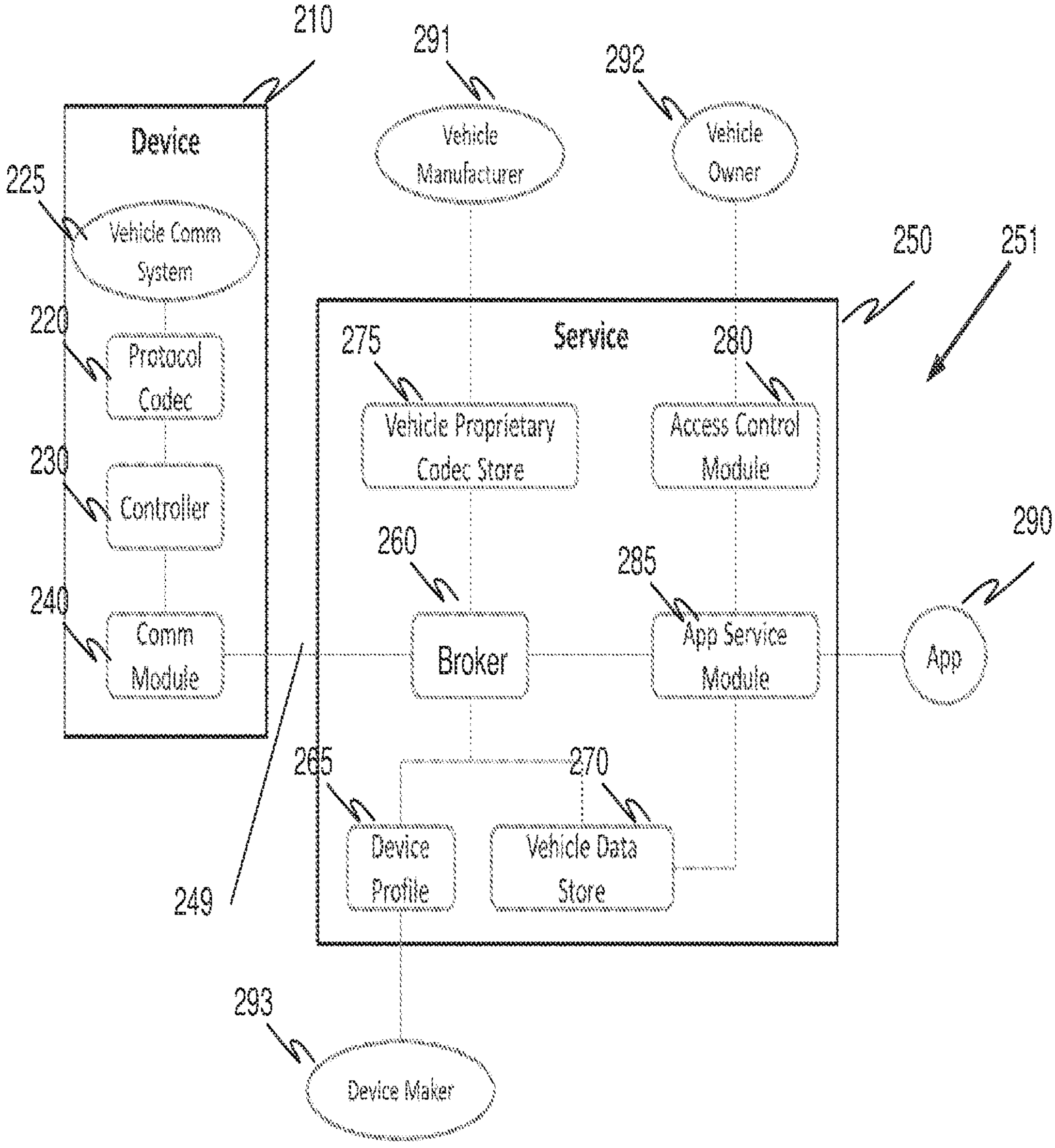
FIG. 2 illustrates a diagram of the present invention in accordance with one or more embodiments.

FIG. 2 illustrates a diagram 200 of the present invention in accordance with one or more embodiments. From FIG. 2, the present invention comprises two primary system functions: a device protocol system (DPS) 210, or device, for interfacing with a vehicle having vehicle data; and a service broker system (SBS) 250, which typically resides remote from the DPS, for communicating with the DPS and with other nodes, addresses and parties a part of the remote network (i.e., vehicle manufacturer, vehicle owner, device maker, application, etc.).

Figure 1:
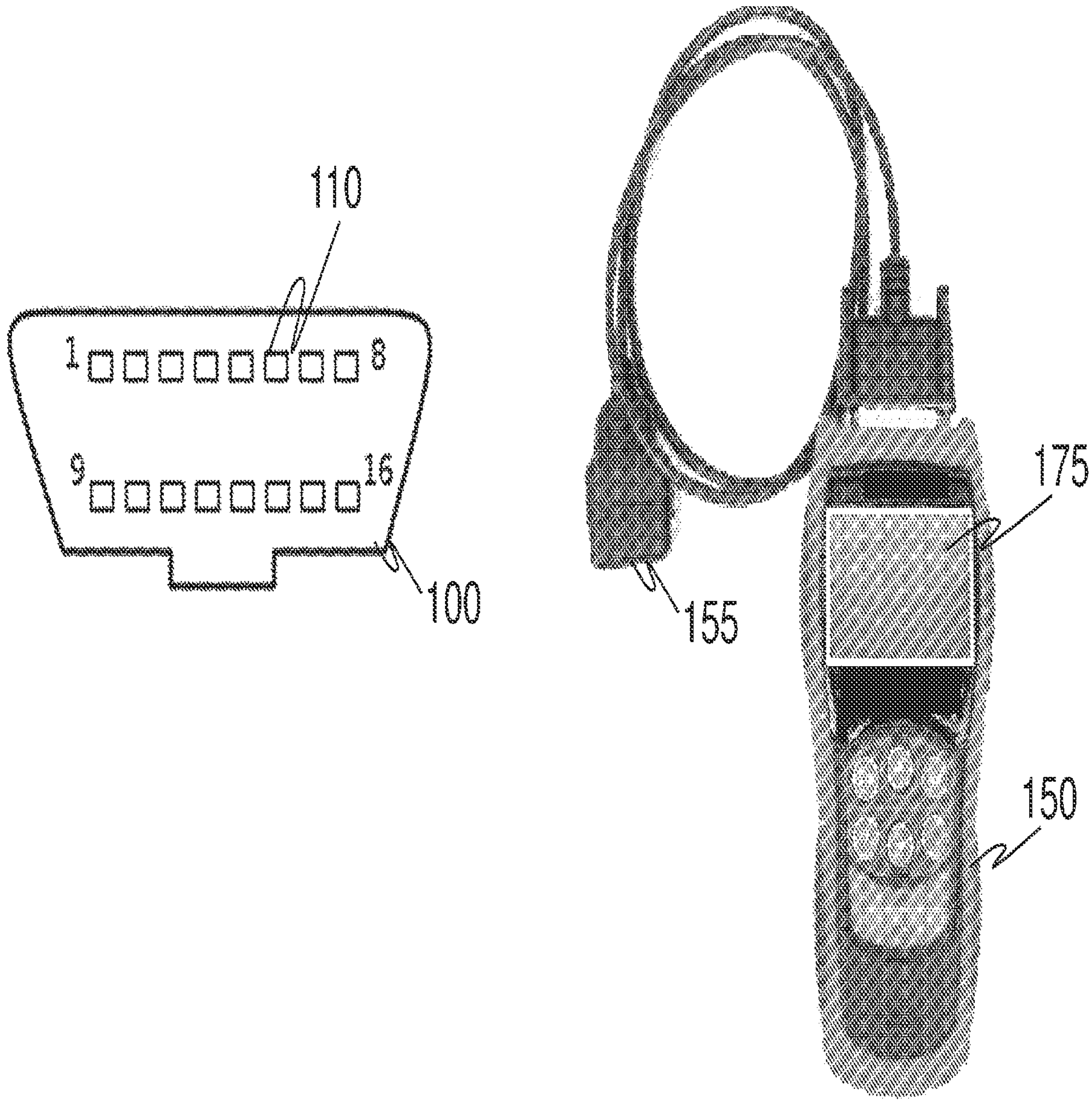
Figure 1 Prior Art
FIG. 1 provides a representative view of an OBD-II diagnostic connector and a tethered reader with a display.

From FIG. 2, the DPS 210 has a device identifier (ID) and includes a device protocol adapter (i.e., device adapter) 220, for interfacing with the vehicle communication system (VCS) of the vehicle 225; a device controller 230, for managing data requests, transmission frequency, event triggers, etc.; and a device communications module 240, for transmitting vehicle data over a remote network 249 to the SBS 250 residing on a network remote 251 from the vehicle and DPS. The VCS 225 is not part of the DPS 210 but is arranged to be in operative communication typically by "plugging in" using conforming connectors, such as those of standardized OBD II connectors of FIG. 1 (16-slot connector J1962 connector) by example.

In one or more preferred embodiments, the device controller also provides support for controlling vehicle diagnostics and reporting from the SBS. Preferably, the controller communicates using a unique protocol to communicate with the SBS Broker component 260 (discussed later and also as a communication server) although the unique protocol is not essential to the present invention. Communication between the DPS and the SBS, across a network 249, is typically handled through the communication linkage between DPS' device controller 230, the device communication module 240, and the SBS' Broker 260, where the communication linkage can be over a variety of communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks. Messages containing information related to commands, vehicle data, service data and proprietary data are passed between the DPS and the SBS across networks 249.

The DPS' device controller, in one or more preferred embodiments may be a circuit board, a control device, software, firmware, or an Arduino board that interfaces with the DPS communication module.

In one or more preferred embodiments, the device communication module 240 provides for transmitting vehicle data over a remote network 251 to the SBS 250. Preferably, the module has a unique identifier (ID) associated with it whereby it may provide an endpoint or network ID that uniquely identifies the communication endpoint in the remote network. An example of an endpoint ID is that of a Mobile Identification Network (MIN), Internet Protocol (IP) v4/IPv6 address and/or API endpoint (URI) and similar.

Vehicle data that is available from the vehicle across the VCS may include any of diagnostic, operational, performance, proprietary, service, and parameter data. The VCS is preferably electronic and in communication arrangement with the engine control unit (ECU) or engine control module (ECM), used interchangeably herein, as well as the DPS to provide current and historical information to the present invention. Preferably, the vehicle data may be communicated across the device protocol system using one or more defined protocols, and which are further preferably compliant with OBD II. Preferential protocols include those that are OBD II compatible including: (1) SAE J1850 PWM; (2) SAE J1850 VPW; (3) ISO 9141-2; (4) ISO 14230 KWP2000; and (5) ISO 15765 CAN bus (referenced herein as "defined protocols").

Further from FIG. 2, is the SBS 250 which is the "service" side of the present invention. The SBS includes: a broker 260, for receiving and sending messages to the device controller 230 via the device communication module 240; a device profile 265, for storing mappings between endpoint or network IDs and Device IDs; a vehicle data store 270, for managing storage and indexing of vehicle data received by the Broker 260; a vehicle proprietary codec store 275, for storing vendor proprietary codecs, where a device maker can store their own codecs if desired thereby protecting their formats and commands as needed; an access control module 280, for providing security, permission and privacy in relation to the obtained or to-be-obtained vehicle data; an application (app) service module 285, for processing requests from applications 290 to access vehicle data; and various interfaces which may be locally or remotely situated in relation to the SBS 250 to provide or request specific information. These interfaces may include, by example: application interface 290, vehicle manufacturer interface 291, vehicle owner interface 292, device maker interface 293; however the present invention is not so limited and is able to be configured to be in communication with other nodes, sources, information and data points provided such points are accessible over the network.

In one or more preferred embodiments, the broker 260 is situated as network middleware that is responsible for receiving and sending messages to the device controller 230. The broker 260 is also responsible for managing triggers or "conditions" that would trigger vehicle data to be sent to an App or Apps 290. For example, an Application 290 may have commands indicating it is to receive vehicle data only when a vehicle speed approaches eighty miles per hour. The broker 260 also maintains a mapping between the Device ID and the Network ID (or endpoint ID).

By the broker maintaining the mapping, an Application may address the device by Device ID only thereby enabling device mobility across different networks that may require different Network IDs. It will be appreciated by those skilled in the art that a Network ID can change for various reasons, where, for example, a MIN may change if the device owner switches to a new network service provider. Similarly, the IP address may change if the device is moved to a different local network. However, by further example, a device ID such as VIN is typically bound to the life time of the device. Therefore, as in the present invention, by decoupling Device ID from Network ID, service portability and mobility to Applications is also provided for.

In one or more further preferred embodiments, the broker 260 will query the device profile 265 upon the receipt of a message from the App service module 285 that is addressed to a device 210. The query will be an attempt to find a communications module network ID for the device that is being addressed.

Similarly, in one or more further preferred embodiments, when the broker 260 receives a message from the device, it will decode the message and store it in the vehicle data store 270. The broker 260 will also then check to determine if there is a pending request from an Application 290 waiting for the message. If there is a pending request, the communication server aspect of the broker 260 will send the data to the Application 290 through the App service module 285.

In one or more further preferred embodiments, the device profile 265 may further contain other information about the device such as vendor, manufacturing date and etc.; and, the vehicle data store 270 may, to improve data retrieval times, partition vehicle data by reporting time intervals and Vehicle Identification Number (VIN) and by indexing each measurement by the values in a data collection.

In further preferred embodiments, the access control module 280 provides for enabling vehicle owners (or vehicle assignees such as a repair shop or authorized other under control of the vehicle) to control how their vehicle data will be shared. Preferably, an owner can set up a data sharing profile (i.e., user profile) with identifiable attributes, such as: VIN, User ID (the entity that will receive and use the data), Authentication and Authorization rules (whether authentication and authorization from the user is required and the type of authentication and authorization), duration (sharing start time and duration), etc. The profile is then stored in the access control module 280.

In further preferred embodiments, the App service module 285, in providing for processing requests from applications to access vehicle data, may encounter that many applications may request the same vehicle data. In response, the App service module may implement data caching to speed up processing times. Operationally, when the App service module receives a request from an app 290 to access data from a vehicle, it communicates with the access control module 280 to determine if this request has been authorized by the vehicle owner. If the owner has not authorized the data access, the module will reject the request from the app.

Typically, in the present invention, the App service module 285 provides two types of data service to Applications. One type of service is to retrieve historical data records from a vehicle. The other service is to retrieve the current vehicle data, where the current vehicle data may be further divided into: (a) One time single request and (b) Tracking request (based on time or geographical area). Historical data can be serviced from the vehicle data store 270. If the request is for "current" data, the App service module will communicate with the broker 260 to send the "current" request to the device 210.

In the present invention, a typical message that may be passed between the DPS and the SBS includes three primary portions: a header, service data and proprietary data.

The header preferably includes the length of message or any message structure information to aid in the decoding of the message. The header includes a Network ID that uniquely identifies the communication module 240 of the device 210 that is sending/receiving the message. The header can also include an identifier to uniquely identify the device sending or receiving the message. The device ID can be a VIN, for example. The header can include a session identifier if the message is sent as part of a communication session between the DPS and SBS and multiple messages may be provided during a single session.

The service data portion preferably includes vehicle data and commands. The proprietary data portion preferably includes proprietary data that may require third party codec (s).

Operationally, the present invention, in one endeavor, has been prototyped using a CAN controller to extract vehicle diagnostics from a test vehicle via an OBD II connector. It will be appreciated that a microcontroller that interfaces with the CAN bus to decode/encode CAN parameters can be implemented while also interfacing with the Controller using RS-232 over a serial port. The CAN bus is a message-based vehicle bus standard protocol designed to allow microcontrollers and devices to communicate with each other within a vehicle without a host computer. It will also be recognized that the CAN bus though originally designed for automotive applications, is also suitable and used in various other industries including industrial automation and medical equipment applications and other Internet of Things (IoT) devices as well as machine to machine (M2M) devices capable of communication. For example, a device warranty company may look at operational health data from all connected devices (such as in case of industrial, medical and automotive manufacturing) to compute and estimate warranty pricing. similarly, for example, the state and local governments may use vehicle GPS data for improving traffic management.

The table below shows a single example of various information that the present invention can collect and export through the OBDII connector, though it should be understood that the present invention is not limited to that represented in the table below:

| Category | Measurement |
|---|---|
| Vehicle | VIN |
| | Vehicle speed |
| | Ambient air temperature |
| | Run-time since engine starts |
| Engine | Engine load |
| | Engine coolant temperature |
| | Engine RPM |
| | Throttle position |
| | Accelerator pedal position |
| | Air flow rate |
| | Engine oil temperature |
| | Engine torque |

-continued

| Category | Measurement |
|---|---|
| Fuel | Short and long term fuel % |
| | Fuel system status |
| | Fuel pressure |
| | Fuel level input |
| | Fuel type |
| | Ethanol fuel % |
| Hybrid | Hybrid battery pack remaining life |

Figure 3:
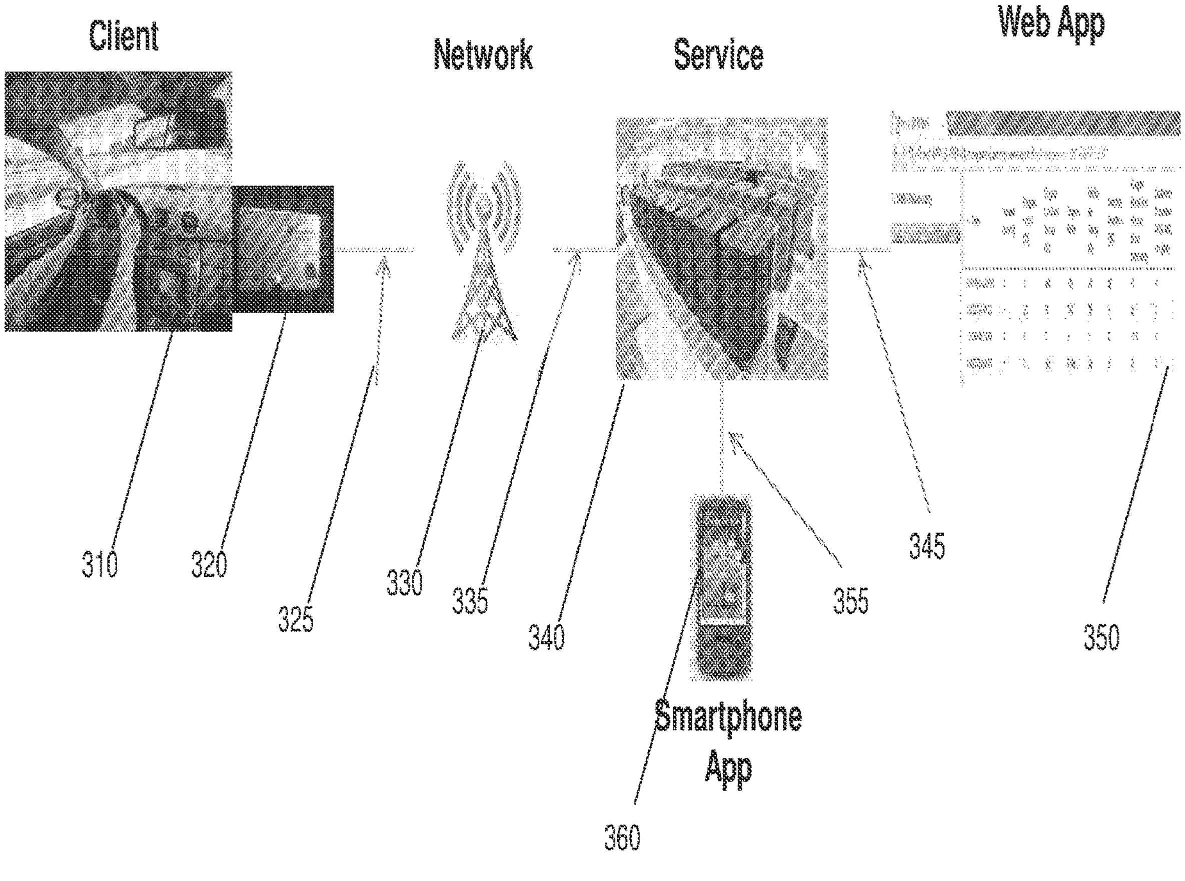
FIG. 3 illustrates a functional information flow of the present invention in accordance with one or more embodiments.

FIG. 3 illustrates a functional information flow 300 of the present invention in accordance with one or more embodiments. From FIG. 3, a vehicle, having an electronic VCS is depicted at 310. The VCS is in communication with a DPS of the present invention at 320. The DPS is able to communicate with the VCS and obtain vehicle information and data across a communication link in bilateral communication. Data received by the DPS from the VCS can then be passed across a network 330 using a communication protocol at 325 and 335. Preferably, the communication protocol at 325 and 335 is a protocol or standard that is cooperative with the OBD 11 standard, where such a protocol may be a custom protocol, an existing protocol, or a hybrid. In one or more embodiments, the protocol at 325 and 335 is based on a CAN bus standard.

Data and message traffic is passed bilaterally, depending on the push or pull of the system, across the network 330. Messages that are passed from the client or device side 310 across the network 330 to the SBS at 340, are received by the SBS (or service side) for processing. In one or more preferred embodiments, the SBS is a service-based activity which based on at least one and preferably a cluster of servers at a location remote from the device. The SBS is able to accommodate the receipt, decoding, encoding, storage, and connectivity for communications with other interfaces in accordance with the requisite commands of the message content and/or associate data owner (i.e., client, owner of device, or owner of vehicle).

Preferably vehicle data received and processed at the SBS is then available for access and utilization via a web-based application or server site in the cloud at 350. Communication of the post-SBS processed vehicle data is passed to the cloud via a web or http protocol/standard at 345 and is preferably encrypted. Similarly, data post-SBS processed is also available via communication device 360 via the appropriate application protocol across a web or http protocol/standard at 355.

Data and message traffic that is provided from a smartphone application 360 or via a web browser 350 is passed to the SBS 340 for processing over a common standard at 345 or 355. The SBS then refers the commands and formats, as instructed or in accordance with a rule-based instruction in relation to a client's user profile (e.g., security, access, encryption, etc.), across the network 330 to the DPS 310. The appropriate DPS 310 is identified by its device ID or instruction, discussed previously.

It will be appreciated by those skilled in the art that there are a variety of implementations of the present invention and the inclusion of technologies, such as protocols and communication standards, which also will enable the present invention to perform as designed.

Figure 4:
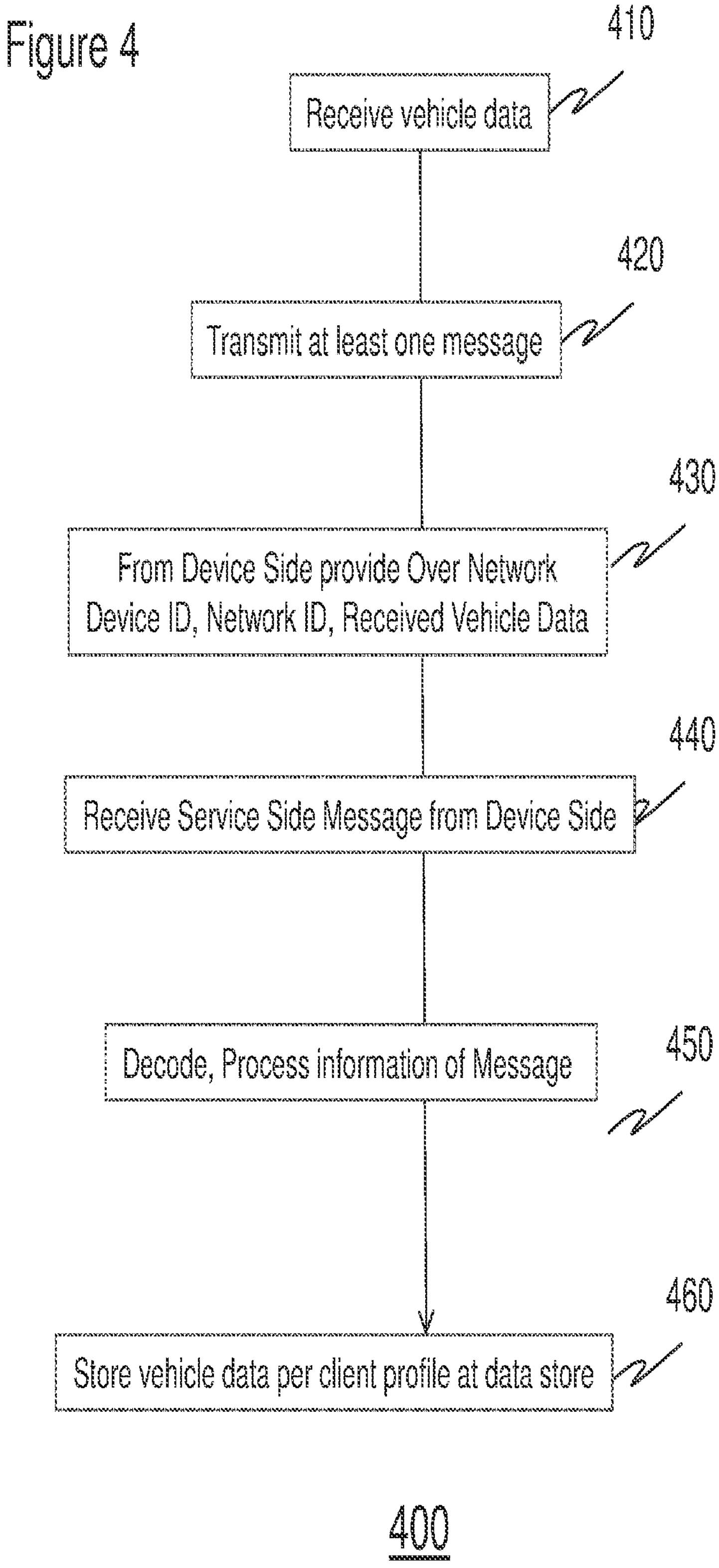
FIG. 4 depicts a processing flow of the present invention in accordance with one or more embodiments, where vehicle data is stored remotely after acquisition from a vehicle across a remote network.

FIG. 4 depicts a processing flow 400 of the present invention in accordance with one or more embodiments, where vehicle data is stored remotely after acquisition from a vehicle across a remote network. From FIG. 4, the communicating and storing of vehicle information from a vehicle across a remote network to one or more remote devices utilizing at least one communication protocol of the vehicle is provided. At 410, vehicle data from the vehicle, via its VCS, is received at a device protocol system in communication arrangement with the vehicle on the device-side or DPS. Preferably, DPS and the VCS are capable of communication across a predetermined protocol. The DPS prepares the received vehicle data with additional information identifying preferably the device ID and the network ID, into a predetermined message format for transmission at 420. Preferably, at least one message is processed and has a device ID, an endpoint ID, and the received vehicle data, where the SBS is capable of mapping the device ID and the endpoint ID. Preferably the endpoint ID may include one or more of a mobile identification network (MIN) identifier, an Internet Protocol (IP) v4 address, an IPv6 address, a device IP address, an address of a user, an address of a vehicle manufacturer, and/or an address of a storage device. Preferably, the message may further include service information, proprietary information and similar. The DPS then sends the message from the device-side to the SBS, or service-side, across a network at 430.

The SBS receives the transmitted message at 440 and processes in accordance with the instructions, user profile, or other command information at 450. The SBS may communicate with applications, external interfaces, vehicle manufacturers, vehicle owners, diagnostic systems, mobile applications, mobile devices, and device protocol systems, etc. depending on the instructions or needs for processing. The SBS will also store the received and decoded vehicle data at a data store in accordance with the rule set of the client profile or other instruction at 460.

Preferably, the data store is located at an address on the remote network associated with an endpoint ID and a network ID. In one or more preferred embodiments, the SBS further includes: a device profile module for storing the mapping of the device ID and the endpoint ID to one or more addresses on the remote network, whereby a device ID includes at least one endpoint ID; a data store being at least one of the one or more remote devices for storing received vehicle data; and, an applications service module for processing requests from software applications to access vehicle data.

Although the above embodiments are described using vehicle as an example device, a person skilled in the art may readily recognize that the method, system and computer program product described herein may also be used for other devices capable of communication, for example, Internet of Things (IoT) devices, machine to machine (M2M) devices, etc.

Further utilization of this stored data and access to device operations may include use of third-party web applications and/or mobile applications (collectively referred to as apps) by end users to carry out different tasks, for example, in case of vehicles, find parking, deliver fuel to their vehicles, perform repairs and maintenance, deliver packages (Amazon, FedEx, UPS) etc. These third-party service providers need permissions (authorization) from the car owner/device owner to perform actions on their car, for example: open/close trunk to deliver packages by a delivery person. The delivery person, in their app, needs to be able to open/close trunk of the vehicle of the owner whom they are delivering the package.

Therefore, it is further desired that access to the data as well as authorized device operations by third-party apps is carried out securely while maintaining data privacy, and security, consent management and monetization. For example, authorization from an IoT device/service owner to the service provider that is secure and valid for a particular period of time to perform these operations.

Hence it is further desired to provide a platform that would allow for maintaining data privacy and security, perform consent management and monetization and provide secure access to the device data and/or authorized device operations to the third-party mobile and web applications also known as consumer applications. that access to the data as well as authorized device operations by third-party apps is carried out securely while maintaining data privacy and security, consent management and monetization. For example, authorization from an IoT device/service owner to the service provider that is secure and valid for a particular period of time to perform these operations.

In one or more embodiments, a computer-implemented method, system and computer program product for providing secure access to one or more devices by an application are disclosed.

In an embodiment, the computer-implemented method for providing secure access to one or more devices by an application includes receiving application information for the application; receiving device information for the one or more devices to which the application is requesting access, wherein the device information for the one or more devices include any one or more of: device identifier (device ID), device capabilities and permissions model for each of the one or more devices. The method further includes receiving rules for allowing the application to access the one or more devices, wherein the access to the one or more devices includes device data, one or more device operations or a combination thereof and allowing the application to access the device based on the rules.

In an embodiment, the computer-implemented method further includes an account linking process. The account linking process includes accessing authorized original equipment manufacturer (OEM) uniform resource identifier (URI) to initiate the account linking process; receiving authorization code from the device owner for authorizing the application to access the one or more devices; providing the received authorization code from the device owner for authorizing the application to access the one or more devices; and receiving access token to access the one or more devices.

In another embodiment, the system for providing secure access to one or more devices by an application includes one or more devices, an authorization, authentication and data broker platform and an application, wherein the authorization authentication and data broker platform: receives application information for the application requesting the access; receives device information for the one or more devices to which the application is requesting access, wherein the device information for the one or more devices includes any one or more of: device identifier (device ID), device capabilities and permissions model for each of the one or more devices. The authorization, authentication and data broker platform further receives rules for allowing the application to access the one or more devices, wherein the access to the one or more devices includes access to device data, one or more device operations or a combination thereof and allows the application to access the one or more devices based on the rules.

In an embodiment, the authorization, authentication and data broker platform further receives authorization code from the application, wherein the authorization code is received by the application from the device owner for authorizing the application to access the one or more devices; and provides access token to the application to access the one or more devices.

In yet another embodiment, a computer program product stored on a computer readable medium for providing secure access to one or more devices by an application, having computer readable instructions for causing a computer to control an execution of an application for providing secure access to one or more devices by an application including receiving application information for the application; receiving device information for the one or more devices to which the application is requesting access, wherein the device information for the one or more devices include any one or more of: device identifier (device ID), device capabilities and permissions model for each of the one or more devices. The instructions further include receiving rules for allowing the application to access the one or more devices, wherein the access to the one or more devices includes device data, one or more device operations or a combination thereof and allowing the application to access the device based on the rules.

In an embodiment, the computer program product further includes computer readable instructions for an account linking process. The instructions for account linking process further include accessing authorized original equipment manufacturer (OEM) uniform resource identifier (URI) to initiate the account linking process; receiving authorization code from the device owner for authorizing the application to access the one or more devices; providing the received authorization code from the device owner for authorizing the application to access the one or more devices; and receiving access token to access the one or more devices In an embodiment, the method, system and computer program product described herein provides secure access to device data and device operations is achieved for example, by allowing car APIs both read and write operations from/to the car by third party service provider apps by using account linking, which may be initiated by an entity in charge, for example, the platform provider and implemented via computer as well as API level scope and throttling of individual APIs implemented via specific rules provided based on type of application, usage duration, number of instances allowed etc.

The read operations may include, for example, reading data from the device such as device status, device health information, fuel level for vehicles, odometer reading for the vehicles, etc. The write operations may include, for example, changing device state such as in case of vehicles, open door, open trunk, etc. Although only a few operations related to vehicle are illustrated here, a person skilled in the art may readily recognize that other such operations may also be performed by using the method, system and computer program product described herein.

The method, system and computer program product described herein provides a platform that would maintain data privacy and security, consent management and monetization and provide secure access to the data as well as authorized device operations to the third-party mobile and web applications.

End users also known as device owners may use third party apps to find services such as parking, deliver fuel to their vehicles, perform repairs and maintenance, deliver packages (Amazon, Fedex, UPS) etc. These third-party service providers need permissions (authorization) from the device owner/IoT device/solution owner, for example, connected car owner to perform actions on their device, for example: open/close trunk of a vehicle to deliver packages by a delivery person. The delivery person, in their app, needs to be able to open/close trunk of the vehicle of the owner whom they are delivering the package.

Therefore, it is further desired that access to the data as well as authorized device operations by third-party apps is carried out securely while maintaining data privacy and security, consent management and monetization. For example, authorization from an IoT device/service owner to the service provider that is secure and valid for a particular period of time to perform these operations.

The authentication, authorization and data broker platform, for example, API One, may do so by account linking, where the device/IoT device/service owner can authorize securely a time bound validity of the permission for the service provider to perform these operations. The authentication, authorization and data broker platform, for example, API One, includes a processor and one or more databases. It may provide a single set of APIs that can access data and perform operations across all original equipment manufacturers (OEMs), reducing time to market for the connected car use cases of the future. The connected device/car platform includes a processor and one or more databases.

Figure 5A:
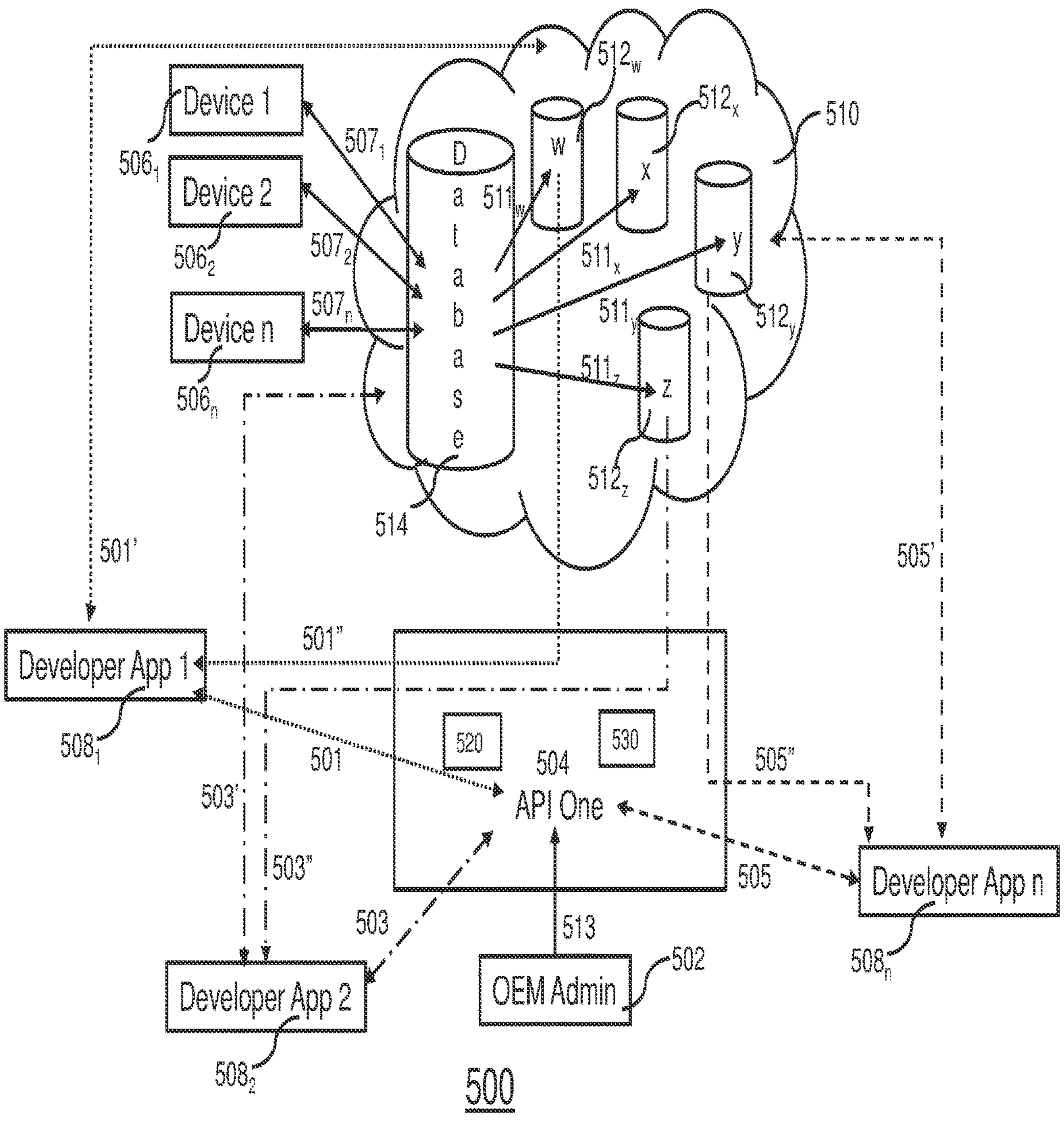
FIG. 5A depicts a system and process 500 for providing secure access to the stored device data by an application in accordance with one or more embodiments described herein.

The authentication, authorization and data broker platform may act as a 'broker', also described herein as API One and illustrated as API One in FIGS. 5A, 5B and 6, by brokering authorizations between the two parties, for example, the car or IoT device owner and the service provider with respect to the vehicle.

For example, in case of vehicles such as cars, the method and system described herein provides secure access to Car APIs for both read and write operations from/to the car to third party service provider apps by effective implementation of account linking, which may be initiated by an entity in charge, for example, the platform provider and implemented via computer as well as API level scope and throttling of individual APIs implemented via specific rules provided based on type of application, usage duration, number of instances allowed etc.

These third-party web applications and/or mobile applications (collectively referred to as apps) may be developed by different developers and may use different protocols, for example, HTTP, REST, TCP/IP, UDP/IP. In an embodiment, the method and system described herein may be compatible with various protocols and may offer scalability to be able to provide services to multiple developers, each with different requirements, for example, HTTP, REST, TCP/IP, UDP/IP.

FIG. 5A depicts a system and process 500 for providing secure access to the stored device data by an application in accordance with one or more embodiments described herein. For example, the system for providing secure access to the one or more devices, wherein the access to devices includes access to device data and/or device operations for the one or ore devices, by an application includes one or more devices, illustrated as Device 1 $\mathbf{506}_1$, Device 2 $\mathbf{506}_2$ . . . Device n $\mathbf{506}_n$, etc. an authorization, authentication and data broker platform 504 illustrated as API One and one or more applications illustrated as Developer App 1 $\mathbf{508}_1$, Developer App 2 $\mathbf{508}_2$ . . . Developer App n $\mathbf{508}_n$, etc. and device connectivity platform 510. The connectivity platform 510 may be on the remote network and the remote network may be a cloud.

The authorization, authentication and data broker platform, and wherein the authorization, authentication and data broker platform 504 illustrated as API One may be on the remote network and the remote network may be a cloud.

The applications illustrated as Developer App 1 $\mathbf{508}_1$, Developer App 2 $\mathbf{508}_2$ . . . Developer App n $\mathbf{508}_n$, etc. submit a request to access one or more devices, which may include access to the device operations and/or access to the device data for those devices illustrated as Device 1 $\mathbf{506}_1$, Device 2 $\mathbf{506}_2$ . . . Device n $\mathbf{506}_n$, etc. by submitting the application information for the application requesting the access and the device information for the one or more devices to which the application is requesting access via steps 501, 503 and 505 respectively.

Alternatively, the applications illustrated as Developer App 1 $\mathbf{508}_1$, Developer App 2 $\mathbf{508}_2$ . . . Developer App n $\mathbf{508}_n$, etc. submit a request to access one or more devices, which may include access to the device operations and/or access to the device data for those devices illustrated as Device 1 $\mathbf{506}_1$, Device 2 $\mathbf{506}_2$ . . . Device n $\mathbf{506}_n$, etc. via steps 501, 503 and 505 respectively. The authorization, authentication and data broker platform 504 illustrated as API One in FIG. 5A may request and receive the application information for the application requesting the access and the device information for the one or more devices to which the application is requesting access from any one or more of the developer apps illustrated as Developer App 1 $\mathbf{508}_1$, Developer App 2 $\mathbf{508}_2$ . . . Developer App n $\mathbf{508}_n$, etc. via steps 501, 503 and 505 respectively. The device information for the one or more devices illustrated as Device 1 $\mathbf{506}_1$, Device 2 $\mathbf{506}_2$ . . . Device n $\mathbf{506}_n$, etc. may include any one or more of: device identifier (device ID), device capabilities and permissions model for each of the one or more devices.

Devices typically have different features and capabilities based on make, model, and year/date of manufacture of the device, for example, a newer model of a car may have a capability to remotely perform climate control that older models may not have; or a specific model of a camera, for example a Ring camera, may have a capability to turn on flood lights while a different model may not support that.

In addition to the functionalities provided by the app service module 285 and the access control module 280 illustrated in FIG. 2 and described in detail in the description accompanying FIG. 2, the platform 504, illustrated as API One, allows an OEM admin to configure a permissions model for a device based on criteria including any one or more of: year, make, model of the device; safety measures to prevent accidents and/or unwanted operations and/or non-permitted data access. When permissions are applied to the capabilities of devices, the admin may decide based on the criteria described above, which operations to allow and which operations to block, also called as a permissions model. As an example—an admin may decide that even though a remote engine start capability exists in a car—he/she may not want third parties to use that for security and liability reasons and may choose to setup the permissions model accordingly. Thus, in an example embodiment, a permission model may be based the type of device and may include permissions that define the access permission for type of data and read-write permissions for the type of operations. In an embodiment, the platform 504, illustrated as API One, may include an access control module 520 and an app service module 530 as illustrated in FIG. 5 similar to the access control module 290 and app service model 285 illustrated in FIG. 2 and described in detail in the description accompanying FIG. 2.

The authorization, authentication and data broker platform 504 illustrated as API One also receives rules for allowing an application to access the one or more devices illustrated as Device 1 $\mathbf{506}_1$, Device 2 $\mathbf{506}_2$ . . . Device n $\mathbf{506}_n$, etc. from the OEA admin 502 via step 513, wherein the access to the one or more devices illustrated as Device 1 $\mathbf{506}_1$, Device 2 $\mathbf{506}_2$ . . . Device n $\mathbf{506}_n$, etc. may include access to device data, one or more device operations or a combination thereof; and allows the application to access the one or more devices illustrated as Device 1 506$_1$, Device 2 506$_2$ . . . Device n 506$_n$, etc. based on the rules.

The devices illustrated as Device 1 506$_1$, Device 2 506$_2$ . . . Device n 506$_n$, etc. may include any one or more of: an Internet of Things (IoT) device, a machine to machine (M2M) device, a vehicle, a mobile transport equipment, an industrial equipment, a medical device, or a device having a communication system, ECU, or similar, to provide data across a communication protocol. The application/s requesting the access may include a web application, a mobile application or a combination thereof.

The rules for allowing an application programming interface (API) of an application are based on attributes including any one or more of: purpose of the application, device data access required to perform the purpose of the application and maximum number of times the application is allowed to access the device data during a pre-determined duration of time.

The access to the device data for the one or more devices by the application is accomplished by using an application programming interface (API) and an endpoint identifier (endpoint ID). The endpoint ID is a destination identifier associated with a network, user, manufacturer, mobile application, device, or other addressable node of the remote network, for example, API endpoint uniform resource identifier (URI); and the device ID is an originating source identifier of the device data to which the access is requested by the application. The endpoint ID may include one or more of: a mobile identification network (MIN) identifier, an Internet Protocol (IP)v4 address, an IPv6 address, API endpoint (URI), a device IP address, an address of a user, an address of a vehicle manufacturer, an address of a storage device.

Device data collected from the devices illustrated as Device 1 506$_1$, Device 2 506$_2$ . . . Device n 506$_n$, etc. is parsed and sorted in different containers. This containerization of the device data described in the co-owned, co-pending application Ser. No. 14/207,378, filed Mar. 12, 2014, entitled "MANAGEMENT OF DATA FEEDS FROM DEVICES AND PUBLISHING AND CONSUMPTION OF DATA".

Figure 6A:
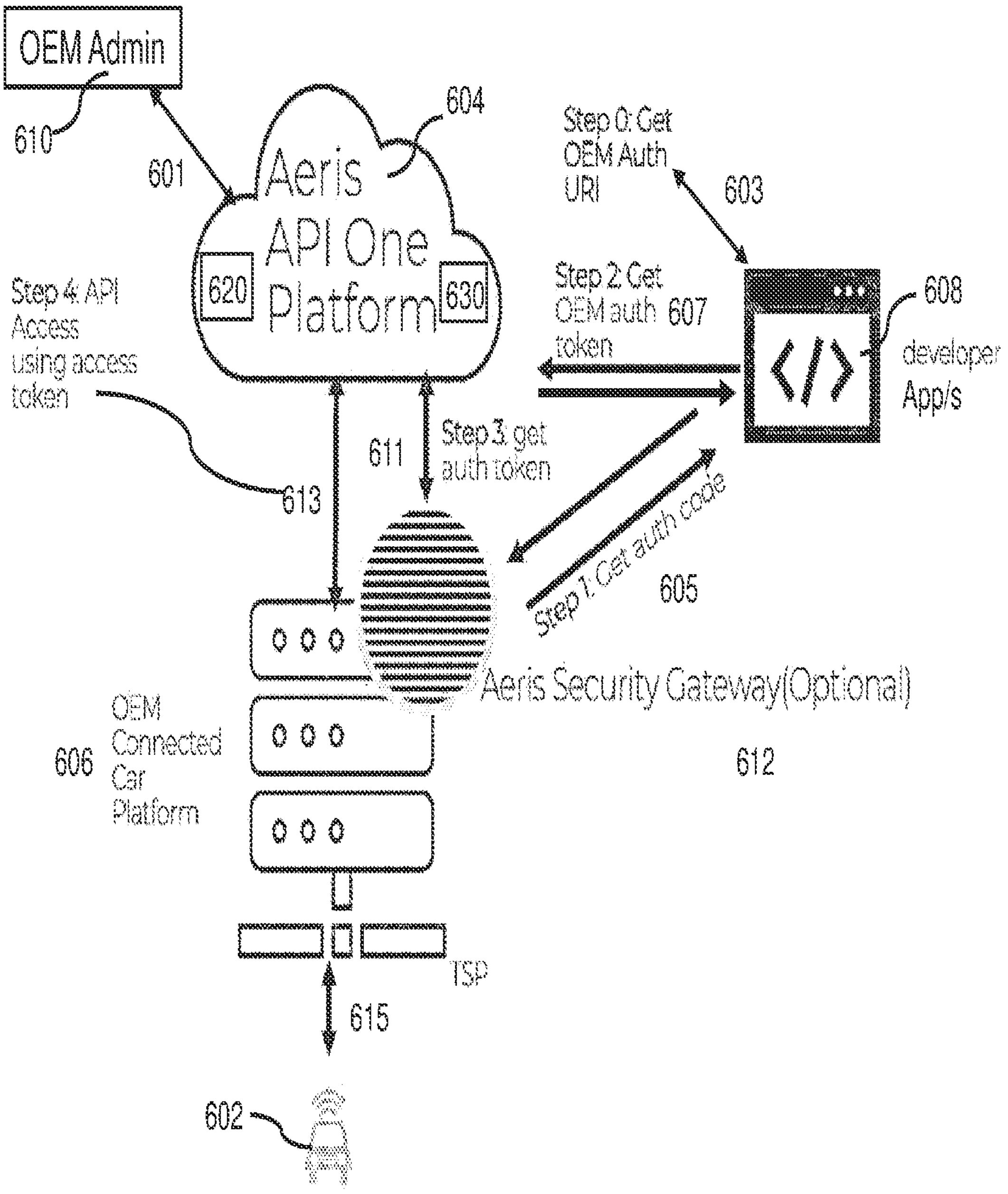
FIG. 6A depicts an exemplary process 600 of account linking for providing secure access to device operations and/or device data by an application in accordance with one or more embodiments described herein.
Figure 6B:
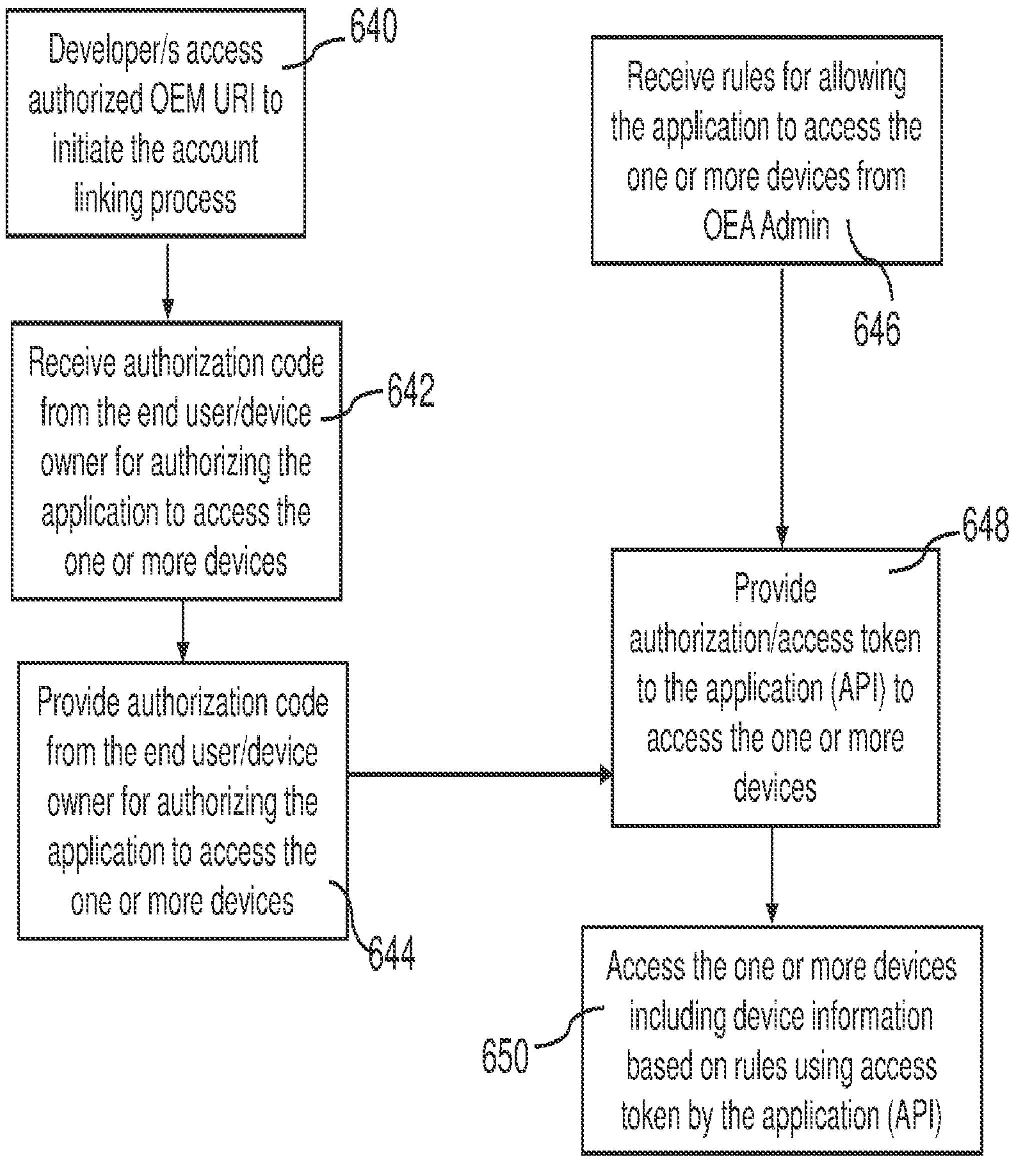
FIG. 6B illustrates an example method 600' for account linking used for providing secure access to device functions and/or device data by an application in accordance with one or more embodiments described herein.

The authorization, authentication and data broker platform 504 illustrated as API One provides the access token to link the endpoint ID, for example, API endpoints (URI) with the device data using account linking as illustrated in FIGS. 6A and 6B and described in detail in the description accompanying FIGS. 6A and 6B.

The application API is authorized and/or authenticated to access the device data for the one or more devices illustrated as Device 1 506$_1$, Device 2 506$_2$ . . . Device n 506$_n$, etc. based on the rules via steps 501', 503' and 505' respectively, and may access the data stored in containers w 512$_w$, x 512$_x$, y 512$_y$, z 512$_z$ etc. via steps 501", 503" and 505" respectively. This containerization of data allows the application to access the data that it is authorized to access. Since the data is parsed and containerized to protect privacy, more than one container may hold the data corresponding to each device. Similarly, a developer app may have access to more than one container depending on the data within the containers. The data may be accessed via authorization, authentication and data broker platform 504 illustrated as API One also shown in FIG. 6, for example, via step 505". The database 514 including containerized data may be on the remote network and the remote network may be a cloud. Although access to containerized data is shown here the method and system described herein may also access data stored using other methods.

In an embodiment, the method and system for providing secure access to an application using application programming interface (API) may further include an interface for allowing same or different protocols to be used for incoming data and outgoing data. For example, data as received from the devices/IoT devices may be raw, error prone and may not be suitable for direct consumption by service providers. This data may be cleansed and normalized across all devices/IoT devices (that may have different software versions running on them) and different IoT device providers/manufacturers for easy consumption by consumers such as service providers who would consume it via various applications.

The API One platform (authentications, authorization and data broker platform) may do so by providing a uniform, easy to use REST API based interface for service providers. For example, the protocols used for incoming data may include any of HTTP, REST, TCP/IP, UDP/IP, whereas the protocols used for incoming data may include any of HTTP, REST, TCP/IP, UDP/IP, in which case the interface may allow use of same different protocols for the incoming data and outgoing data. For example, the protocol used for the incoming data may be HTTP, whereas the protocol used for the outgoing data may be TCP/IP.

The method, system and computer program product described herein provide a platform that may work across different devices, for example, Device 1 506$_1$ may be a vehicle, Device 2 506$_2$ may be a medical device . . . Device n 506$_n$ may be an IoT device such as a sensor, etc. A person skilled in the art may readily understand that these are for examples only and many other devices enabled for communication which can provide the device data and/or accept and/or respond to remote commands may also benefit from this invention.

Additionally, or alternatively, the method, system and computer program product described herein provide a platform that may work across different devices and/or service providers. The service providers may offer operational intelligence that may be read and operations that may be performed on the services it offers. The services may include services provided by the gas stations, parking lots, or garage door openers, and/or beyond vehicles entirely by performing home automation.

For example, in case of parking lots, the operational intelligence may include dynamic information such as number of parking spaces available at a particular time and/or static information such number of parking spaces available for electric vehicles, number of parking spaces available for drivers with disabilities, in that parking lot, etc.

Although, an example of parking lot is provided herein, a person skilled in the art may readily understand that similar type of operational intelligence may be provided and used for various service providers where IoT devices capable of communication are installed.

Similarly, the method, system and computer program product described herein provide a platform that may work across different applications, for example, the applications illustrated as Developer App 1 508$_1$, Developer App 2 508$_2$ . . . Developer App n 508$_n$, etc. that can work in concert with different devices described above and with different functionalities may also benefit from this invention.

FIG. 5B depicts a system and process 500' for providing secure access to device operations by an application in accordance with one or more embodiments described herein. For example, the system for providing secure access to the one or more devices, wherein the access to devices includes access to device data and/or device operations for the one or more devices by an application includes one or more devices, illustrated as Device 1 $506_1$, Device 2 $506_2$ . . . Device n $506_n$, etc. an authorization, authentication and data broker platform 504 illustrated as API One and one or more applications illustrated as Developer App 1 $508_1$, Developer App 2 $508_2$ . . . Developer App n $508_n$, etc., and connected device platform 510. The connected device platform 510 may be on the remote network and the remote network may be a cloud.

The authorization, authentication and data broker platform, and wherein the authorization, authentication and data broker platform 504 illustrated as API One may be on the remote network and the remote network may be a cloud.

The applications illustrated as Developer App 1 $508_1$, Developer App 2 $508_2$ . . . Developer App n $508_n$, etc. submit a request to access one or more devices, which may include access to the device operations and/or access to the device data for those devices illustrated as Device 1 $506_1$, Device 2 $506_2$ . . . Device n $506_n$, etc. by submitting the application information for the application requesting the access and the device information for the one or more devices to which the application is requesting access via steps 501, 503 and 505 respectively.

Alternatively, the applications illustrated as Developer App 1 $508_1$, Developer App 2 $508_2$ . . . Developer App n $508_n$, etc. submit a request to access one or more devices, which may include access to the device operations and/or access to the device data for those devices illustrated as Device 1 $506_1$, Device 2 $506_2$ . . . Device n $506_n$, etc. via steps 501, 503 and 505 respectively. The authorization, authentication and data broker platform 504 illustrated as API One in FIG. 5A may request and receive the application information for the application requesting the access and the device information for the one or more devices to which the application is requesting access from any one or more of the developer apps illustrated as Developer App 1 $508_1$, Developer App 2 $508_2$ . . . Developer App n $508_n$, etc. via steps 501, 503 and 505 respectively. The device information for the one or more devices illustrated as Device 1 $506_1$, Device 2 $506_2$ . . . Device n $506_n$, etc. may include any one or more of: device identifier (device ID), device capabilities and permissions model for each of the one or more devices.

As described above, devices typically have different features and capabilities based on year, make and model of the device, for example, a newer model of a car may have a capability to remotely perform climate control that older models may not have; or a specific model of a camera, for example a Ring camera, may have a capability to turn on flood lights while a different model may not support that.

In addition to the functionalities provided by the app service module 285 and the access control module 280 illustrated in FIG. 2 and described in detail in the description accompanying FIG. 2, the platform 504, illustrated as API One, allows an OEM admin to provide a permissions model for a device based on criteria including any one or more of: year, make, model of the device; safety measures to prevent accidents and/or unwanted operations and/or non-permitted data access. When permissions are applied to the capabilities of devices, the admin may decide based on the criteria described above, which operations to allow and which operations to block, also known as a permissions model. As an example—an admin may decide that even though a remote engine start capability exists in a car—he/she may not want third parties to use that for security and liability reasons and may choose to setup the permissions model accordingly. For example, a permission model may be based the type of device and may include permissions that define the access permission for type of data and read-write permissions for the type of operations. In an embodiment, the platform 504, illustrated as API One, may include an access control module 520 and an app service module 530 as illustrated in FIG. 5 similar to the access control module 290 and app service model 285 illustrated in FIG. 2 and described in detail in the description accompanying FIG. 2.

The authorization, authentication and data broker platform 504 illustrated as API One also receives rules for allowing an application to access the one or more devices illustrated as Device 1 $506_1$, Device 2 $506_2$ . . . Device n $506_n$, etc. from the OEA admin 502 via step 513, wherein the access to the one or more devices illustrated as Device 1 $506_1$, Device 2 $506_2$ . . . Device n $506_n$, etc. may include access to device data, one or more device operations or a combination thereof; and allows the application to access the one or more devices illustrated as Device 1 $506_1$, Device 2 $506_2$ . . . Device n $506_n$, etc. based on the rules.

The devices illustrated as Device 1 $506_1$, Device 2 $506_2$ . . . Device n $506_n$, etc. may include any one or more of: an Internet of Things (IoT) device, a machine to machine (M2M) device, a vehicle, a mobile transport equipment, an industrial equipment, a medical device, or a device having a communication system, ECU, or similar, to provide data across a communication protocol. The application/s requesting the access may include a web application, a mobile application or a combination thereof.

The rules for allowing an application programming interface (API) of an application are based on attributes including any one or more of: purpose of the application, device operations access required to perform the purpose of the application, device data access required to perform the purpose of the application, maximum number of times the application is allowed to access the device operations during a pre-determined duration of time, maximum number of times the application is allowed to access the device data during a pre-determined duration of time.

The access to the one or more devices by the application is accomplished by using an application programming interface (API) and an endpoint identifier (endpoint ID). The endpoint ID is a destination identifier associated with a network, user, manufacturer, mobile application, device, or other addressable node of the remote network; and the device ID is an originating source identifier of the device data to which the access is requested by the application. The endpoint ID may include one or more of: a mobile identification network (MIN) identifier, an Internet Protocol (IP) v4 address, an IPv6 address, API endpoint (URI), a device IP address, an address of a user, an address of a vehicle manufacturer, an address of a storage device.

The authorization, authentication and data broker platform 504 illustrated as API One provides the token to link the endpoint ID, for example, API endpoint (URI) with the access to device data (for example, read-write operations) using account linking as illustrated in FIGS. 6A and 6B and described in detail in the description accompanying FIGS. 6A and 6B.

The application API is authorized and/or authenticated to access the device operation for the one or more devices illustrated as Device 1 $506_1$, Device 2 $506_2$ . . . Device n $506_n$, etc. based on the rules via steps 501', 503' and 505' respectively, and may access the corresponding device operations via connected device platform 510, for reading data via steps 501", 503" and 505" respectively and for writing data via steps 501'", 503'" and 505'" respectively.

The data may be accessed via authorization, authentication and data broker platform 504 illustrated as API One also shown in FIG. 6, for example, via steps 505" and 505'".

In an embodiment, the method and system for providing secure access to an application using application programming interface (API) may further include an interface for allowing same or different protocols to be used for incoming data and outgoing data. For example, data as received from the devices/IoT devices may be raw, error prone and may not be suitable for direct consumption by service providers. This data may be cleansed and normalized across all devices/IoT devices (that may have different software versions running on them) and different IoT device providers/manufacturers (for example, OEMs) for easy consumption by consumers such as service providers who would consume it via various applications.

The API One platform (authentications, authorization and data broker platform) may do so by providing a uniform, easy to use REST API based interface for service providers. For example, the protocols used for incoming data may include any of HTTP, REST, TCP/IP, UDP/IP, whereas the protocols used for incoming data may include any of HTTP, REST, TCP/IP, UDP/IP, in which case the interface may allow use of same different protocols for the incoming data and outgoing data. For example, the protocol used for the incoming data may be HTTP, whereas the protocol used for the outgoing data may be TCP/IP.

The method, system and computer program product described herein provide a platform that may work across different devices, for example, Device 1 506$_1$ may be a vehicle, Device 2 506$_2$ may be a medical device . . . Device n 506$_n$ may be an IoT device such as a sensor, etc. A person skilled in the art may readily understand that these are for examples only and many other devices enabled for communication which can provide the device data and/or accept and/or respond to remote commands may also benefit from this invention.

Similarly, the method, system and computer program product described herein provide a platform that may work across different applications, for example, the applications illustrated as Developer App 1 508$_1$, Developer App 2 508$_2$ . . . Developer App n 508$_n$, etc. that can work in concert with different devices described above and with different functionalities may also benefit from this invention.

Although FIG. 5A illustrates access to device data by the applications and FIG. 5B illustrates access to device operation, the same account linking mechanism illustrated in FIG. 6 and described in detail in the description accompanying FIG. 6 may be used to access device data and device operations may be used by different applications either separately or together as desired by that applications to access device data and/or device operations for the one or more devices.

Similarly, the scopes defined in API One 504 for each developer app illustrated as Developer App 1 508$_1$, Developer App 2 508$_2$ . . . Developer App n 508$_n$, etc. for accessing data (illustrated in FIG. 5A) and/or using device operations (illustrated in FIG. 5B), for example, in case of a vehicle: unlock door, get odometer level, get fuel level, etc. are illustrated by FIG. 7 and described in detail in the description accompanying FIG. 7.

Figure 5C:
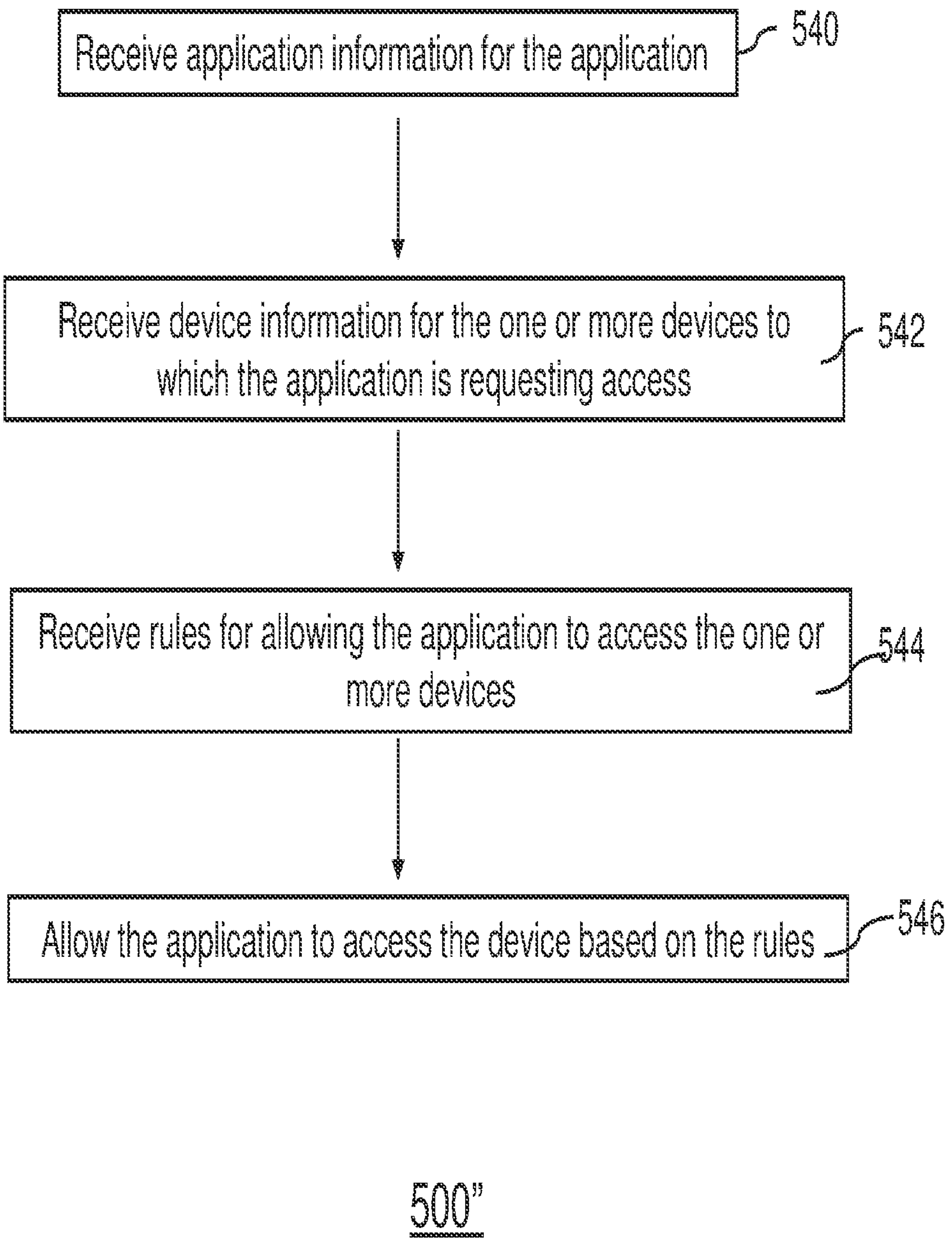
FIG. 5C illustrates an example method 500" for providing secure access to device data and/or operations by an application in accordance with one or more embodiments of the invention described herein.

FIG. 5C illustrates an example method 500" for providing secure access to device data and/or operations described above in FIGS. 5A and 5B according to one or more embodiments of the invention described herein. The method 500" for providing secure access to one or more devices by an application includes receiving application information for the application via step 540; receiving device information for the one or more devices to which the application is requesting access via step 542, wherein the device information for the one or more devices include any one or more of: device identifier (device ID), device capabilities and permissions model for each of the one or more devices. The method further includes receiving rules for allowing the application to access the one or more devices via step 544, wherein the access to the one or more devices includes device data, one or more device operations or a combination thereof and allowing the application to access the device based on the rules via step 546.

As illustrated in FIGS. 5A and 5B, the authorization, authentication and data broker platform receives a request to access one or more devices, which may include access to the device operations and/or access to the device data for those devices. The authorization, authentication and data broker platform may request and receive the application information for the application requesting the access and the device information for the one or more devices to which the application is requesting access from any one or more of the developer apps. The device information for the one or more devices may include any one or more of: device identifier (device ID), device capabilities and permissions model for each of the one or more devices.

The authorization, authentication and data broker platform also receives rules for allowing an application to access the one or more devices from the OEA admin via step 544, wherein the access to the one or more devices may include access to device data, one or more device operations or a combination thereof.

The authorization, authentication and data broker platform may then allow the application to access the one or more devices based on the rules via step 546. The data (read)/device operations (read-write) may be accessed via authorization, authentication and data broker platform.

FIG. 6A illustrates an example system and method 600 for account linking used for providing secure access to device functions and/or device data by an application in accordance with one or more embodiments described herein.

In addition to the functionalities provided by the app service module 285 and the access control module 280 illustrated in FIG. 2 and described in detail in the description accompanying FIG. 2, the platform 604, illustrated as API One, implements the account linking flow. Using this account linking the device owner authorizes the third-party application's to access data including read or read and write permissions (device operations) as requested by the third-party application/s for that device. In an embodiment, the platform 604, illustrated as API One, includes an access control module 620 and an app service module 630 as illustrated in FIG. 6 similar to the access control module 290 and app service model 285 illustrated in FIG. 2 and described in detail in the description accompanying FIG. 2.

The account linking, for example links the device owner's device account with the device owner's app account. For example, a connected car owner's connected car account with the connected car owner's Amazon account.

The system 600 includes one or more devices 602, an authentication, authorization and data broker platform 604, illustrated as Aeris API One platform, OEM connected car platform 606, one or more developers 608, OEM admin 610 and optional security gateway 612. Account linking illustrated in FIG. 6, step 1 605 includes secure authentication and time bound validity of one or more permissions for the service provider (developer app 608) by the device owner (not shown) to perform certain operations, wherein the authentication, authorization and data broker platform 604 performs a function of a "broker' (API One) brokering authorizations and data between the two parties—the device/car owner and the service provider 608 with respect to the device/vehicle 602.

The developer/s 608 access authorized OEM URI via step 603 to initiate the account linking process wherein the end user/device owner is prompted to enter their credentials which lets the developer/s 608 get OEM authorization code via step 605 from the optional security gateway 612. The authorization code is then used by the API One platform 604 to get the access token using the pre-provisioned OEM Client ID and Secret via step 611. The same authorization code may be used by the app to get access token for each instance of use until the same device owner has the ownership of that device.

OEM admin 610 may provide a predefined set of access rules based on device capabilities and permissions model and application functionalities to the authentication, authorization and data broker platform 604 via step 601, which are used by the authentication, authorization and data broker platform 604 to provide access token to the one or more developer apps 608 via step 607. The developer apps may then access the connected car platform 606 using the API access token via step 613.

Thus, account linking includes allowing the device owner to log via the service provider's app using credentials of the device account and authorizing access to device data and/or device operations to the service provider app. 608. For example, if a delivery service such as Amazon, is a developer app 608, the car owner of the car where the package is to be delivered will log into his amazon account and provide authorization (authorization code) to the Amazon delivery service to open and close trunk of the car for the delivery. API One 604 then gets the access token using the authorization code. Using this access token, subsequent read/write operations are performed by the service provider, for example. Amazon delivery service, via API One platform 604.

The application may then perform the remote operations on the device via step 615, for example, read-write operations on the device. The read operations may include, for example, reading data from the device such as device status, device health information, fuel level for vehicles, odometer reading for the vehicles, location of the device, etc. depending on the application. The write operations may include, for example, changing device state such as in case of vehicles, open door, open trunk, etc. depending on the application. Although only a few operations related to vehicle are illustrated here, a person skilled in the art may readily recognize that other operations may also be performed depending on the device and application by using the method, system and computer program product described herein.

In an embodiment, the authentication, authorization and data broker platform 604 may act as a 'broker', also described herein as API One, by brokering authorizations and data between the two parties, for example, the car or the IoT device owner and the service provider with respect to the vehicle. In this example, the authorization from an IoT device/service owner may be provided via authentication, authorization and data broker platform to the service provider that is secure and valid for a particular period of time to perform these operations. The authentication, authorization and data broker platform may do so by account linking where the device/IoT device/service owner can authorize securely a time bound validity of the permission for the service provider to perform these operations.

Since not all APIs are created equal, for example, different APIs may be created based on access to different data, different operations etc., for example, the car manufacturer, for example, OEM admin 610 may want to allow or disallow certain API access to third parties and may want to limit the API to be executed a max number of times in a configurable time window. This is typically done to secure the connected car and mitigating denial of service attacks and to achieve a way to price API usage.

The 'broker' (API One) may present a portal where device manufacturers, for example, OEM admin 610, for example, car manufacturers, can pick and choose which service provider gets access to which APIs and set throttling limits against each service provider and or each API. For example, one manufacturer may allow a delivery service such as Amazon delivery to access operations such as opening and closing the trunk only but not start the car but may allow another developer full access such as starting the vehicle, depending on the type of application.

An example of throttling limit is to allow a delivery service such as Amazon to open the trunk only once per hour, or twice per day. If the trunk is opened more than the number of times allowed, such action may be not permitted and a large number of unexpected attempts may be inferred to represent a denial-of-service attack) based on the access rules provided by the OEM admin 610. Similarly, the throttling limit may be set so as to disallow a user of a service provide app for sharing cars to start/stop the car more than 20 times.

Although vehicles are used as an example to describe the invention, a person skilled in the art may readily recognize the method and system may be similarly used for devices other than vehicles where access to device operation and/or device data is sought by using apps.

FIG. 6B illustrates an example method 600' described above in FIG. 6A for account linking used for providing secure access to device functions and/or device data by an application in accordance with one or more embodiments described herein. In an embodiment, the developer app accesses authorized OEM URI to initiate the account linking process via step 640.

The end user/device owner is prompted to enter their credentials to authorize the developer app to access the one or more devices which lets the developer app get OEM authorization code from end user/device owner via step 642 which may be provided via optional security gateway. The authentication, authorization and data broker platform receives device information for the one or more devices to which the application is requesting access and the authorization code received from end user/device owner via step 642 from the developer apps via step 644.

The authorization code is then used by the authentication, authorization and data broker platform to get the authorization/access token using the pre-provisioned OEM Client ID and Secret, which is then provided to the developer apps via step 648.

Additionally, the OEM admin may provide a predefined set of access rules based on device capabilities and permissions model and application functionalities to the authentication, authorization and data broker platform via step 646, which are used by the authentication, authorization and data broker platform to provide API access/authorization token to the one or more developers via step 648 using the authorization code and the rules. The developer apps may then access the device via connected device platform using the API access token via step 650.

Figure 7A:
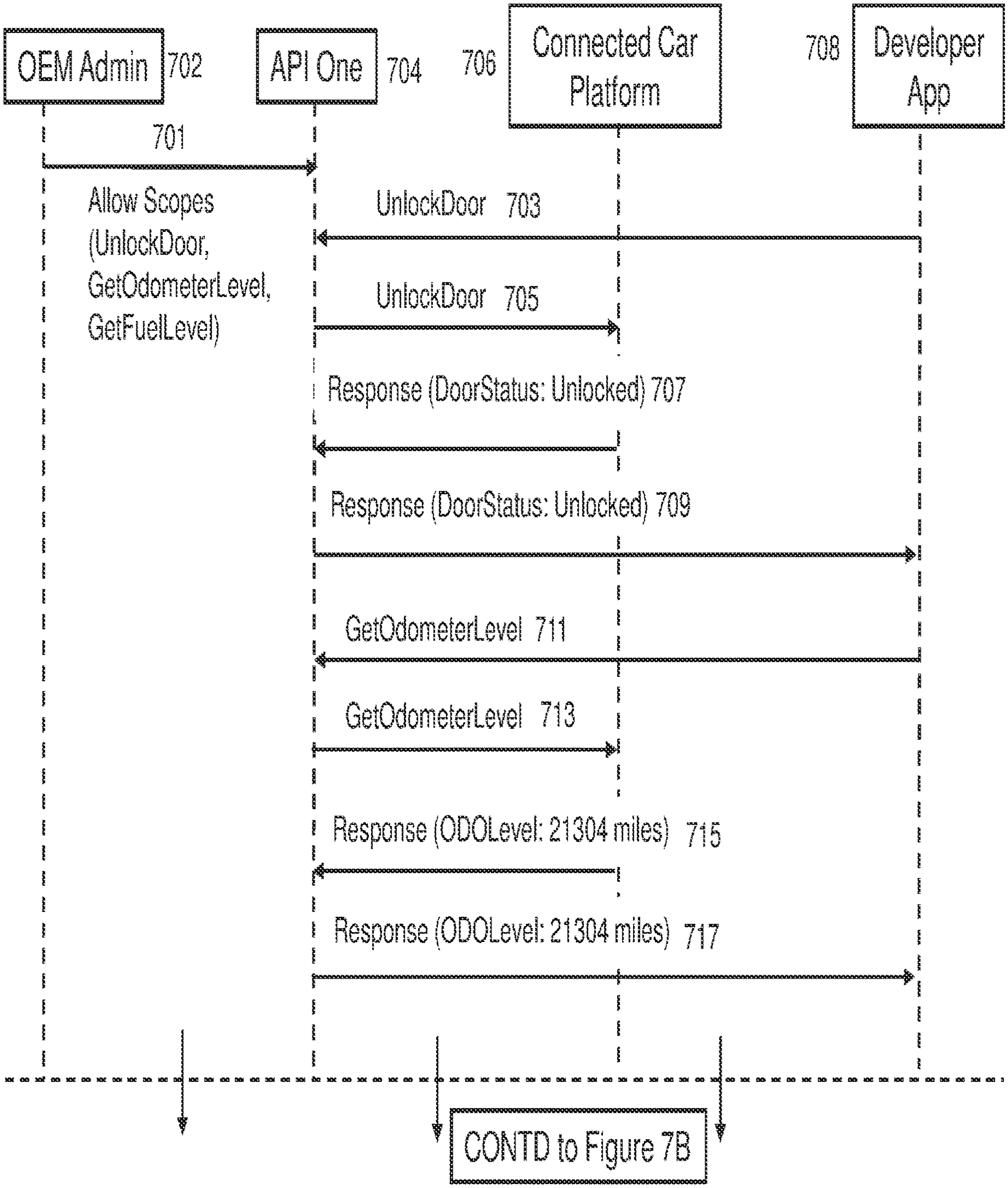
FIGS. 7A, 7B and 7C depict an exemplary process 700 for providing secure access to device operations and/or device data by an application in accordance with one or more embodiments described herein.
Figure 7B:
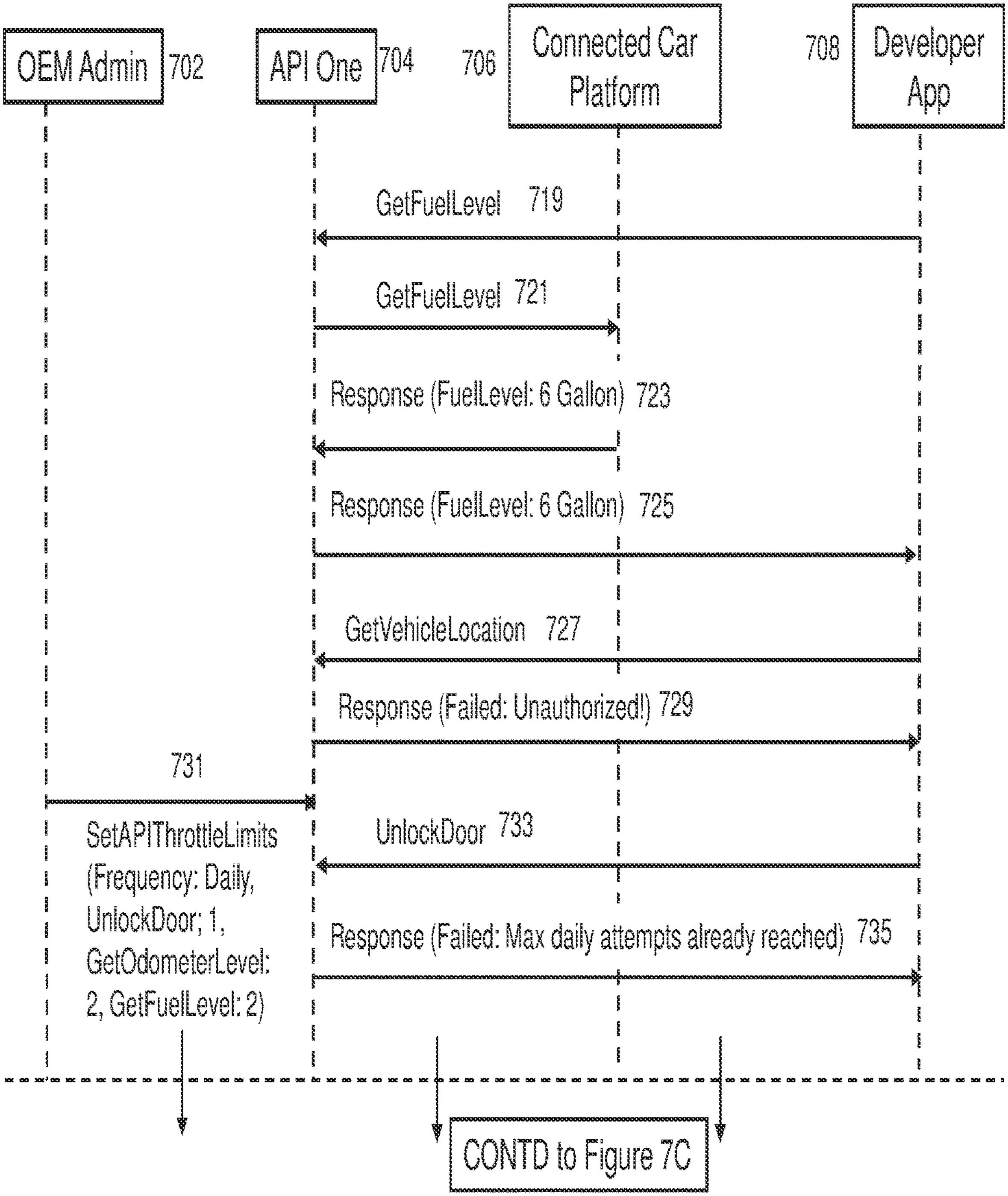
Figure 7C:
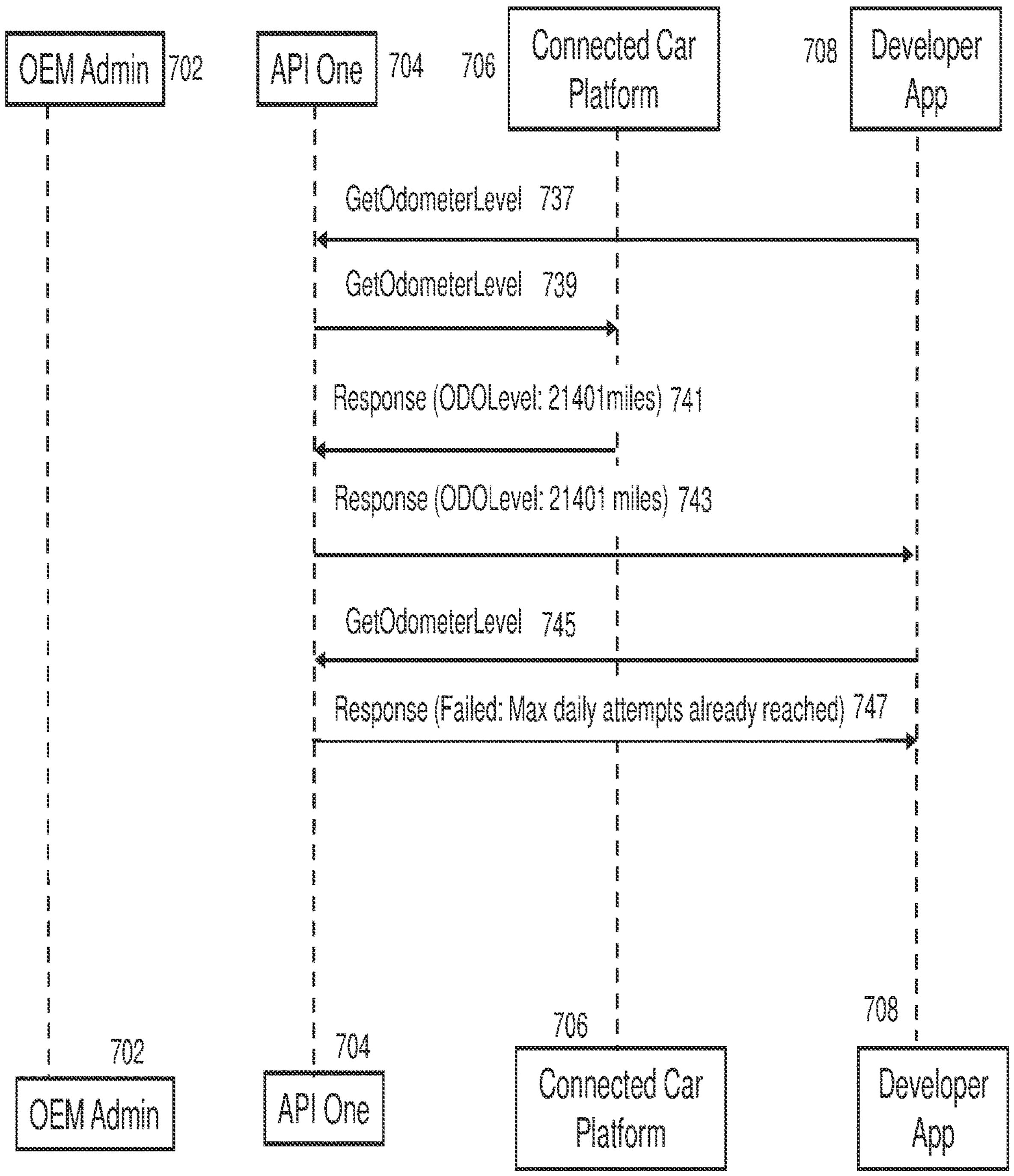

FIGS. 7A, 7B and 7C depict an exemplary process 700 for implementing throttling limits as used in providing secure access to the data and/or authorized device operation in accordance with one or more embodiments described herein. For example, OEA admin 702 may allow scopes in API One 704 for each developer app 608 for accessing data and/or using device operations, for example, in case of a vehicle these may include unlock door, get odometer level, get fuel level, etc. via step 701. The developer app 708 may request API One 704 to unlock door via step 703. The API One 704 may check which device operations are allowed for the developer app 708 to access and forward the request to unlock door to connected car platform 706 via step 705. If allowed, the connected car platform 706 may respond by unlocking the door and updating the door status as "unlocked" via step 707 to API One 704, which then forwards the response to the developer app 708 via step 709.

Similarly, for example, in case of a vehicle, the developer app 708 may request API One 704 to get odometer level via step 711. The API One 704 may check if the developer app 708 is allowed to access the requested data and forward the request to get odometer level to connected car platform 706 via step 713. If allowed, the connected car platform 706 may respond by reading the odometer level and updating the odometer level by providing the reading, for example, 21304 miles, via step 715 to API One 704, which then forwards the response to the developer app 708 via step 717.

Similarly, for example, in case of a vehicle, the developer app 708 may request API One 704 to get fuel level via step 719. The API One 704 may check if the developer app 708 is allowed to access the requested data and forward the request to get fuel level to connected car platform 706 via step 721. If allowed, the connected car platform 706 may respond by reading the fuel level and updating the fuel level by providing the reading, for example, 6 gallons, via step 723 to API One 704, which then forwards the response to the developer app 708 via step 725.

Similarly, OEM admin 702 may set up API Throttle limits in API One 704 for each developer app 708 for accessing data and/or using device operations, for example, in case of a vehicle these may include allowed frequency for performing certain operations or accessing certain data, as frequency: daily, UnlockDoor; 1 (allow once a day), GetOdometerLevel: 2 (allow twice a day), GetFuelLevel: 2 (allow twice a day), etc. In such cases once the developer app 608 has requested unlock door as described above and the door is unlocked in response to that request, another request to unlock door via step 733 during the specified period of time will be denied by the API One 604 as illustrated by step 735 as failed due to max daily attempts already reached.

However, since GetOdometerLevel: 2 (allow twice a day), is set such that two such requests are allowed in a day, the second request 737 will also be responded to as illustrated by steps 741 and 743. Since only two such requests are allowed in a day, a third request 745 will be denied by the API One 704 as illustrated by step 747 as failed due to max daily attempts already reached.

Although unlock door, get odometer level, get fuel level are the device operations and data access examples provided herein, a person skilled in the art may readily recognize that other device operations and/or data access can be managed similarly. Also, although example throttle limits are illustrated as frequency: daily, UnlockDoor; 1 (allow once a day), GetOdometerLevel: 2 (allow twice a day), GetFuelLevel: 2 (allow twice a day), a person skilled in the art may readily recognize that other throttle limits may be similarly set.

Furthermore, although vehicles are used as an example to describe the invention, a person skilled in the art may readily recognize the method and system may be similarly used for devices other than vehicles where access to device operations and/or device data is sought by using apps.

Figure 8:
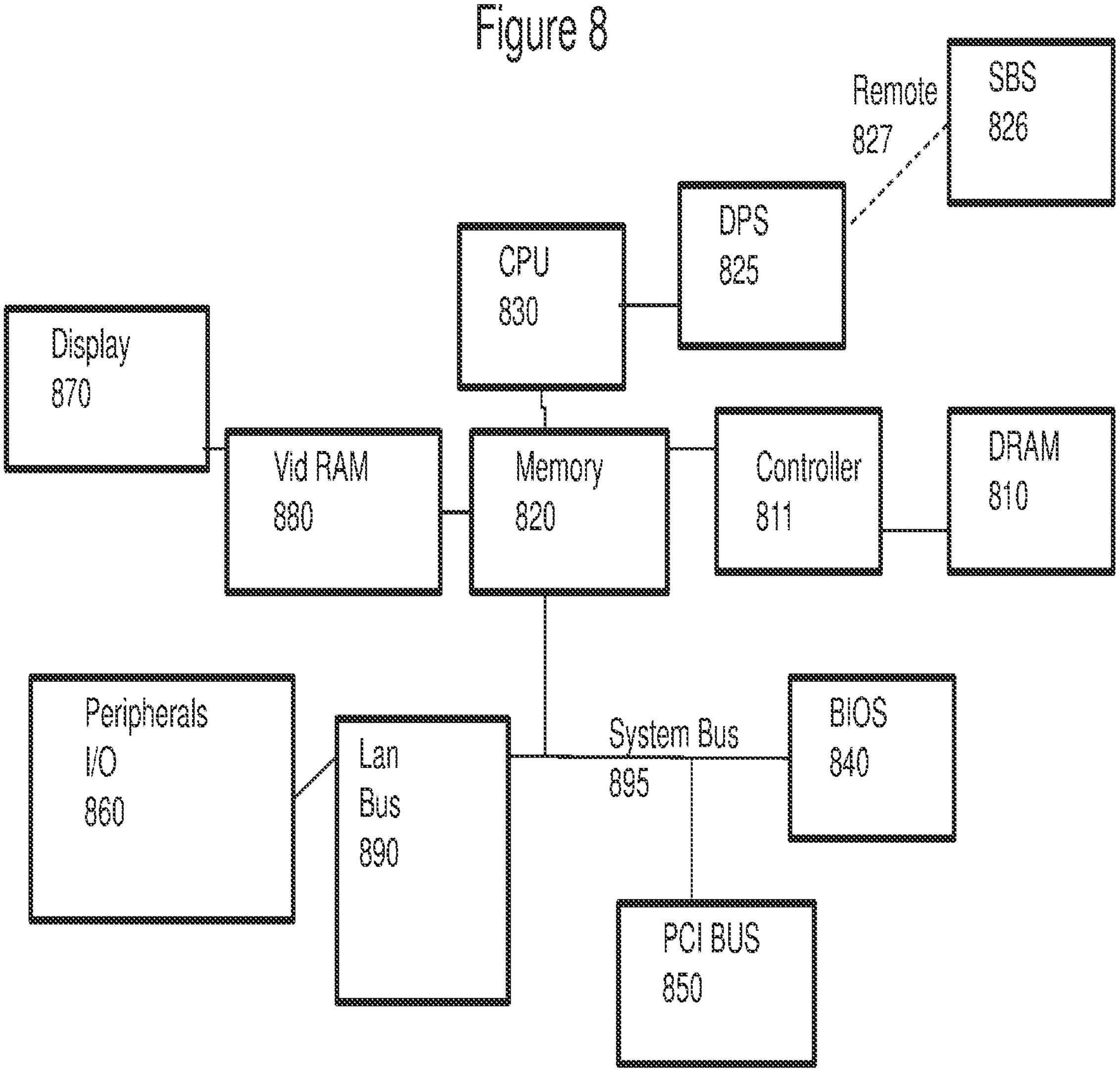
FIG. 8 is a block diagram of a computer with a device side in communication with a service side using the present invention.

FIG. 8 is a block diagram 800 of a computer with a device side in communication with a service side using the present invention. FIG. 8 depicts a personal computer (PC) orientation using the present invention, in which a central processing unit 830, memory 820, memory controller 811 with logic, and DRAM 810 are operably arranged to communicate with one another to perform commands and transactions in association with a DPS 825. Also present is a video RAM memory 880 with a display 870 connection, peripherals and input/output devices 860 connected with a LAN Bus 890, BIOS 840, PCI BUS 850 and system bus 895. The logic of the memory controller is programmable and preferably has an application to provide logic to operate the PC using the present invention. The logic is able to perform the processing operation of the present invention, in accordance for instance with FIG. 2, and then provide commands using define protocols and preferred protocols across one or more remote networks as previously set forth. The DPS and the SBS 826 communicate over a remote network 827 using a preferred protocol. The PC is one example of an implementation of the present invention, though the present invention may be used or implemented in a variety of forms such as software, firmware, hardware, application, web-based operation, or any combination thereof.

Figure 9:
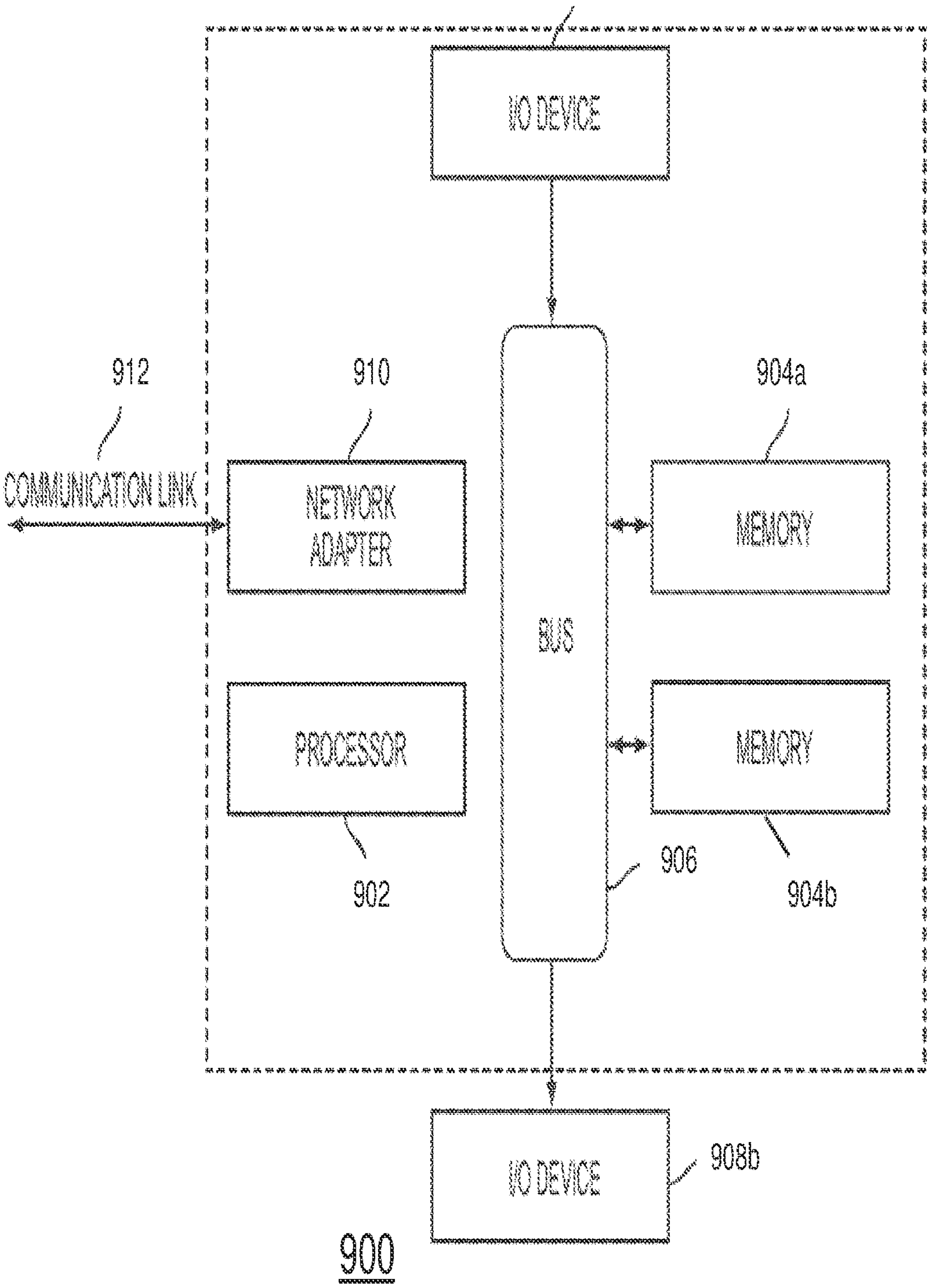
FIG. 9 illustrates a data processing system 900 suitable for storing the computer program product and/or executing program code in accordance with an embodiment of the present invention.

FIG. 9 illustrates a data processing system 900 suitable for storing the computer program product and/or executing program code in accordance with an embodiment of the present invention. The data processing system 900 includes a processor 902 coupled to memory elements 904*a-b* through a system bus 906. In other embodiments, the data processing system 900 may include more than one processor and each processor may be coupled directly or indirectly to one or more memory elements through a system bus.

Memory elements 904*a-b* can include local memory employed during actual execution of the program code, bulk storage, and cache memories that provide temporary storage of at least some program code in order to reduce the number of times the code must be retrieved from bulk storage during execution. As shown, input/output or I/O devices 908*a-b* (including, but not limited to, keyboards, displays, pointing devices, etc.) are coupled to the data processing system 900. I/O devices 808*a-b* may be coupled to the data processing system 900 directly or indirectly through intervening I/O controllers (not shown).

In FIG. 9, a network adapter 910 is coupled to the data processing system 802 to enable data processing system 902 to become coupled to other data processing systems or remote printers or storage devices through communication link 912. Communication link 912 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present disclosure in more detail refer now to the following description in conjunction with the accompanying Figures.

It will be appreciated by those skilled in the art that the term ECU may also be used interchangeably with the term or equivalent of powertrain control module (PCM) which is typically referenced to be a electronic control unit capable of controlling a series of actuators on an internal combustion engine to ensure the optimum operation.

As used herein, the term device in one or more embodiments may include Internet of Things (IoT) device capable of communication, machine to machine (M2M) device capable of communication, automobile, mobile transport equipment, industrial equipment, medical device, or device having a communication system, ECU, or similar, to provide data across a communication protocol.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications network includes communications across a network (such as that of a network for machine-to-machine or M2M communications but not limited thereto) using one or more communication architectures, methods, and networks, including but not limited to: Code division multiple access (COMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

What is claimed is:

1. A computer-implemented method for providing secure access to one or more devices by an application, the method comprising:

receiving application information for the application;

receiving device information for the one or more devices to which the application is requesting access, wherein the device information for the one or more devices includes any one or more of: device identifier (device ID), device capabilities, and permissions model for each of the one or more devices;

receiving rules for allowing the application to access the one or more devices, wherein the access to the one or more devices includes access to device data, access to one or more device operations, or a combination thereof; and allowing the application to access the one or more devices based on the rules.

2. The computer-implemented method of claim 1, wherein the rules for allowing the application to access the one or more devices a are based on attributes comprising any one or more of: a purpose of the application, device operation access required to perform the purpose of the application, device data access required to perform the purpose of the application, a maximum number of times the application is allowed to access the device operation during a pre-determined duration of time, and a maximum number of times the application is allowed to access the device data during a pre-determined duration of time.

3. The computer-implemented method of claim 1, wherein the access to the one or more devices by the application is accomplished by using an application programming interface (API) and an endpoint identifier (ID).

4. The computer-implemented method of claim 3, the endpoint ID is a destination identifier associated with a network, user, manufacturer, mobile application, device, or other addressable node of a remote network; and the device ID is an originating source identifier of the device data or the device for which access to the device operation is requested by the application.

5. The computer-implemented method of claim 3, wherein the endpoint ID is one or more of: a mobile identification network (MIN) identifier, an Internet Protocol version 4 (IPv4) address, an IPV6 address, an API endpoint (URI), a device IP address, an address of a user, an address of a vehicle manufacturer, and an address of a storage device.

6. The computer-implemented method of claim 1, wherein the device data comprises data generated by the device as a result of device usage.

7. The computer-implemented method of claim 1, wherein the application to access the device comprises one or more applications.

8. The computer-implemented method of claim 7, wherein the one or more applications include a web application, a mobile application or a combination thereof.

9. The computer-implemented method of claim 1, wherein the method for providing secure access to one or more devices by an application using application programming interface (API) further includes allowing same or different protocols to be used for incoming data and outgoing data.

10. The computer-implemented method of claim 9 wherein the same or different protocols include any of: HTTP, REST, TCP/IP, and UDP/IP.

11. The computer-implemented method of claim 1, wherein the one or more devices include any one or more of: an Internet of Things (IoT) device, a machine to machine (M2M) device, a vehicle, a mobile transport equipment, an industrial equipment, a medical device, or a device having a communication system, ECU, or similar, to provide data across a communication protocol.

12. The computer-implemented method of claim 1, wherein the method is performed by an authorization, authentication and data broker platform, and wherein the authorization, authentication and data broker platform is on a remote network and the remote network is a cloud.

13. The computer-implemented method of claim 1 further including an account linking process, wherein the account linking process further comprises:

accessing an authorized original equipment manufacturer (OEM) uniform resource identifier (URI) to initiate the account linking process;

receiving an authorization code from the device owner for authorizing the application to access the one or more devices;

providing the received authorization code from the device owner for authorizing the application to access the one or more devices; and receiving an access token to access the one or more devices.

14. A system for providing secure access to one or more devices by an application, the system comprising one or more devices, an authorization, authentication and data broker platform and an application, wherein the authorization, authentication and data broker platform:

receives application information for the application requesting the access;

receives device information for the one or more devices to which the application is requesting access, wherein the device information for the one or more devices includes any one or more of: a device identifier (device ID), and device capabilities, and permissions model for each of the one or more devices .;

receives rules for allowing the application to access the one or more devices, wherein the access to the one or more devices includes access to device data, access to one or more device operations, or a combination thereof; and allows the application to access the one or more devices based on the rules.

15. The system of claim 14, wherein the rules for allowing the application to access the one or more devices are based on attributes comprising any one or more of: a purpose of the application, device operation access required to perform the purpose of the application, device data access required to perform the purpose of the application, a maximum number of times the application is allowed to access the device operation during a pre-determined duration of time, and a maximum number of times the application is allowed to access the device data during a pre-determined duration of time.

16. The system of claim 14, wherein the access to one or more devices by the application is accomplished by using an application programming interface (API) and an endpoint identifier (ID).

17. The system of claim 16, the endpoint ID is a destination identifier associated with a network, user, manufacturer, mobile application, device, or other addressable node of a remote network; and the device ID is an originating source identifier of the device data or the device for which access to the device operation is requested by the application.

18. The system of claim 16, wherein the endpoint ID is one or more of: a mobile identification network (MIN) identifier, an Internet Protocol version 4 (IPv4) address, an IPv6 address, an API endpoint (URI), a device IP address, an address of a user, an address of a vehicle manufacturer, and an address of a storage device.

19. The system of claim 14, wherein the device data comprises data generated by the device as a result of device usage.

20. The system of claim 14, wherein the application to access the one or more devices comprises one or more applications.

21. The system of claim 20, wherein the one or more applications include a web application, a mobile application or a combination thereof.

22. The system of claim 14, wherein the system for providing secure access to one or more devices by an application further includes an interface that allows same or different protocols to be used for incoming data and outgoing data.

23. The system of claim 22 wherein the same or different protocols include any of: HTTP, REST, TCP/IP, and UDP/IP.

24. The system of claim 14, wherein the one or more devices include any one or more of: an Internet of Things (IoT) device, a machine to machine (M2M) device, a vehicle, a mobile transport equipment, an industrial equipment, a medical device, or a device having a communication system, ECU, or similar, to provide data across a communication protocol.

25. The system of claim 14, wherein the authorization, authentication and data broker platform is on a remote network and the remote network is a cloud.

26. The system of claim 14, wherein the authorization, authentication and data broker platform further receives an authorization code from the application, wherein the authorization code is received by the application from the device owner for authorizing the application to access the one or more devices; and provides an access token to the application to access the one or more devices.

27. A computer program product stored on a computer readable medium for providing secure access to one or more devices by an application, comprising computer readable instructions for causing a computer to control an execution of an application for providing secure access to one or more devices by an application comprising:

receiving application information for the application;

receiving device information for the one or more devices to which the application is requesting access, wherein the device information for the one or more devices includes any one or more of: a device identifier (device ID), and device capabilities, and permissions model for each of the one or more devices;

receiving rules for allowing the application to access the one or more devices, wherein the access to the one or more devices includes access to device data, access to one or more device operations, or a combination thereof; and allowing the application to access the one or more devices based on the rules.

28. The computer program product of claim 27, wherein the rules for allowing the application to access the one or more devices are based on attributes comprising any one or more of: a purpose of the application, device operation access required to perform the purpose of the application, device data access required to perform the purpose of the application, a maximum number of times the application is allowed to access the device operation during a pre-determined duration of time, and a maximum number of times the application is allowed to access the device data during a pre-determined duration of time.

29. The computer program product of claim 27, wherein the access to the one or more devices by the application is accomplished by using an application programming interface (API) and an endpoint identifier (ID).

30. The computer program product of claim 29, the endpoint ID is a destination identifier associated with a network, user, manufacturer, mobile application, device, or other addressable node of a remote network; and the device ID is an originating source identifier of the device data or the device for which access to the device operation is requested by the application.

31. The computer program product of claim 29, wherein the endpoint ID is one or more of: a mobile identification network (MIN) identifier, an Internet Protocol version 4 (IPv4) address, an IPv6 address, API endpoint (URI), a device IP address, an address of a user, an address of a vehicle manufacturer, and an address of a storage device.

32. The computer program product of claim 29, further comprising computer readable instructions for an account linking process, wherein the account linking process further comprises accessing an authorized original equipment manufacturer (OEM) uniform resource identifier (URI) to initiate the account linking process; receiving an authorization code from the device owner for authorizing the application to access the one or more devices; providing the received authorization code from the device owner for authorizing the application to access the one or more devices; and receiving an access token to access the one or more devices.

33. The computer program product of claim 27, wherein the device data comprises data generated by the device as a result of device usage.

34. The computer program product of claim 27, wherein the application to access the device comprises one or more applications.

35. The computer program product of claim 34, wherein the one or more applications include a web application, a mobile application or a combination thereof.

36. The computer program product of claim 27, wherein the instructions for providing secure access to one or more devices by an application further include instructions that allows same or different protocols to be used for incoming data and outgoing data.

37. The computer program product of claim 36 wherein the same or different protocols include any of: HTTP, REST, TCP/IP, and UDP/IP.

38. The computer program product of claim 27, wherein the one or more devices include any one or more of: an Internet of Things (IoT) device, a machine to machine (M2M) device, a vehicle, a mobile transport equipment, an industrial equipment, a medical device, or a device having a communication system, ECU, or similar, to provide data across a communication protocol.

39. The computer program product of claim 27, wherein the method is performed by an authorization, authentication and data broker platform, and wherein the authorization, authentication and data broker platform is on the a remote network and the remote network is a cloud.

* * * * *